(12) United States Patent
Sun et al.

(10) Patent No.: US 11,057,879 B2
(45) Date of Patent: Jul. 6, 2021

(54) ALL-DIGITAL SOFTWARE-DEFINED COGNITIVE HETEROGENEOUS NETWORK TRANSCEIVER ARCHITECTURE

(71) Applicant: AGENCY FOR SCIENCE, TECHNOLOGY AND RESEARCH, Singapore (SG)

(72) Inventors: Sumei Sun, Singapore (SG); Ernest Kurniawan, Singapore (SG); Ho Huat Peh, Singapore (SG); Peng Hui Tan, Singapore (SG); Koichi Adachi, Singapore (SG); Jin Gon Joung, Singapore (SG)

(73) Assignee: AGENCY FOR SCIENCE, TECHNOLOGY AND RESEARCH, Singapore (SG)

(*) Notice: Subject to any disclaimer, the term of this patent is extended or adjusted under 35 U.S.C. 154(b) by 0 days.

(21) Appl. No.: 16/089,360

(22) PCT Filed: Mar. 29, 2017

(86) PCT No.: PCT/SG2017/050170
§ 371 (c)(1),
(2) Date: Sep. 27, 2018

(87) PCT Pub. No.: WO2017/171647
PCT Pub. Date: Oct. 5, 2017

(65) Prior Publication Data
US 2019/0124648 A1    Apr. 25, 2019

(30) Foreign Application Priority Data
Mar. 29, 2016    (SG) .............................. 10201602466S

(51) Int. Cl.
*H04W 72/04* (2009.01)
*H04W 88/10* (2009.01)
(Continued)

(52) U.S. Cl.
CPC ..... *H04W 72/0433* (2013.01); *H04L 67/2842* (2013.01); *H04W 4/70* (2018.02);
(Continued)

(58) Field of Classification Search
CPC . H04W 72/0433; H04W 28/08; H04W 16/04; H04W 4/04; H04W 67/2842;
(Continued)

(56) References Cited

U.S. PATENT DOCUMENTS

2009/0055471 A1* 2/2009 Kozat ................... H04L 67/104
                                                            709/203
2012/0188949 A1 7/2012 Salkintzis et al.
(Continued)

FOREIGN PATENT DOCUMENTS

CN          104796918 A       7/2015

OTHER PUBLICATIONS

Wang et al. ("Potentials and Challenges of C-RAN Supporting Multi-RATs toward 5G mobile networks," vol. 2, pp. 1187-1195 (Oct. 1, 2014) (Year: 2014).*
(Continued)

*Primary Examiner* — Farid Seyedvosoghi
(74) *Attorney, Agent, or Firm* — Womble Bond Dickinson (US) LLP

(57) ABSTRACT

A system for controlling a network is provided. The system may include a circuit configured to provide interface support to a plurality of remote radio heads. Each remote radio head may support multiple radio access technologies. The system may include a controller configured to control the circuit and the plurality of remote radio heads. The controller may be configured to control the circuit and the plurality of remote radio heads based on statistical information inferred from the data traversing through the circuit and the real time network state information of the network. The circuit may be
(Continued)

connected to each remote radio head of the plurality of remote radio heads via one or more respective fronthaul links.

15 Claims, 21 Drawing Sheets

(51) Int. Cl.

| | |
|---|---|
| *H04L 29/08* | (2006.01) |
| *H04W 4/70* | (2018.01) |
| *H04W 84/00* | (2009.01) |
| *H04W 28/16* | (2009.01) |
| *H04W 28/08* | (2009.01) |
| *H04W 24/08* | (2009.01) |
| *H04W 88/08* | (2009.01) |
| *H04W 88/12* | (2009.01) |

(52) U.S. Cl.
CPC .......... *H04W 28/08* (2013.01); *H04W 28/16* (2013.01); *H04W 84/00* (2013.01); *H04W 88/10* (2013.01); *H04W 24/08* (2013.01); *H04W 88/085* (2013.01); *H04W 88/12* (2013.01)

(58) Field of Classification Search
CPC ... H04W 88/10; H04W 88/12; H04W 88/085; H04W 84/00; H04W 28/16; H04W 4/70; H04W 88/08; H04W 24/08; H04L 67/2842
USPC .......................................................... 455/449
See application file for complete search history.

(56) References Cited

U.S. PATENT DOCUMENTS

| | | | |
|---|---|---|---|
| 2014/0031049 A1* | 1/2014 | Sundaresan ......... | H04W 84/042 455/447 |
| 2014/0052860 A1* | 2/2014 | Duggal ............... | H04L 63/0892 709/225 |
| 2014/0133322 A1* | 5/2014 | Steer ........................ | H01Q 3/26 370/252 |
| 2015/0195858 A1* | 7/2015 | Jin .......................... | H04W 76/10 370/230 |
| 2015/0229397 A1* | 8/2015 | Shibata ............. | H04B 10/25753 398/115 |
| 2016/0088483 A1* | 3/2016 | Kao ........................ | H04L 5/0001 455/422.1 |
| 2016/0105355 A1* | 4/2016 | Shaw ...................... | H04L 45/22 709/217 |
| 2016/0255578 A1* | 9/2016 | Lin ........................ | H04W 76/14 455/522 |
| 2016/0278061 A1* | 9/2016 | Peng ....................... | H04L 43/16 |
| 2017/0079059 A1* | 3/2017 | Li .......................... | H04W 16/02 |
| 2017/0202005 A1* | 7/2017 | Madan ............... | H04W 72/1231 |

OTHER PUBLICATIONS

Potentials and Challenges of C-RAN Supporting Multi-RATs toward 5G mobile networks, vol. 2, pp. 1187-1195 (Oct. 1, 2014) (Year: 2014).*
PCT International Search Report for PCT Counterpart Application No. PCT/SG2017/050170 Containing International Search Report, 6 pgs. (dated Jun. 17, 2017)
PCT Written Opinion of the International Searching Authority for PCT Counterpart Application No. PCT/SG2017/050170, 8 pgs. (dated Jun. 17, 2017).
PCT International Preliminary Report on Patentability for PCT Application No. PCT/SG2017/050170, 9 pgs. (dated Oct. 2, 2018).
R. Wang, et al., "Potentials and Challenges of C-RAN Supporting Multi-RATs Towards 5G Mobile Networks," IEEE Access, vol. 2, pp. 1187-1195 (Oct. 1, 2014).
P. Rost, et al., "Cloud technologies for flexible 5G radio access networks," IEEE Communications Magazine, vol. 52, No. 5, pp. 68-76 (May 2014).
P.K. Agyapong, et al., "Design considerations for a 5G network architecture," IEEE Communications Magazine, vol. 51, No. 11, pp. 1-19 (Nov. 2014).
M.M. Rahman, et al., "Service Differetiation in Software Defined Virtual Heterogeneous Wireless Networks," 2015 IEEE International Conference on Ubiquitous Wireless Broadband (ICUWB), pp. 1-5 (Oct. 7, 2015).

* cited by examiner

ALL-DIGITAL SOFTWARE-DEFINED COGNITIVE HETEROGENEOUS NETWORK TRANSCEIVER ARCHITECTURE

CROSS-REFERENCE TO RELATED APPLICATION(S)

This patent application is a U.S. National Phase Application under 35 U.S.C. § 371 of International Application No. PCT/SG2017/050170, filed on 29 Mar. 2017, entitled ALL-DIGITAL SOFTWARE-DEFINED COGNITIVE HETEROGENEOUS NETWORK TRANSCEIVER ARCHITECTURE, which claims the benefit of Singapore Patent Application No. 10201602466S, entitled "All-Digital Software-Defined Cognitive HetNet Transceiver Architecture" and filed on Mar. 29, 2016, which was expressly incorporated by reference herein in its entirety.

TECHNICAL FIELD

Various aspects of this disclosure generally relate to wireless communication systems, and more particularly, to an all-digital transceiver architecture to support heterogeneous network (HetNet).

BACKGROUND

The next-generation wireless communications network may need to address the exponentially growing capacity demand, generated from many smart mobile applications and the massive number of connected devices. It may need to address the diverse user demands, ranging from high throughput connectivity, to low latency real-time network access, and low-rate bursty traffic, etc. These characteristics are in-line with $5^{th}$ generation mobile networks (5G) requirements, which include ultra-high radio speed (20 Gbps per UE for new RAT, mmWave, and massive MIMO), ultra-low latency (less than one msec for use cases like Tactile Internet, autonomous driving, remotely controlled machine), massive connectivity (hundreds of millions of devices for Machine Type Communications (MTC)/Device to Device (D2D) communications), and energy saving and cost reduction. There is no single radio access technology (RAT), and no available single contiguous wideband of spectrum, to fulfill the demands simultaneously.

Heterogeneous Network (HetNet), by integrating intelligently and seamlessly multiple networks, including the cellular radio access network (RAN) and Wi-Fi using different radio access technologies (RATs) over different carrier frequencies, as well as the wireless and wired core network (CN), is one promising approach to meet the diverse user requirement and the high capacity demand. The HetNet may also integrate the wireless sensor networks as component networks to support the massive number of connected sensors. It is, however, very challenging, to design an agile and fast-adapting HetNet to achieve cost, energy, and spectrum efficiency, and at the same time meet the diverse quality of service (QoS) and quality of experience (QoE) requirements of the users. For example, each component network may have its own protocols, operating frequency, and hence also the software and hardware implementation. Different component network may have different coverage, capacity, and QoS. Furthermore, different resources from different wireless systems may not be shared among one another. Different networks also may not readily share information such as traffic volume, network load, latency, etc., with one another. Although mobile devices may switch networks, they lack the necessary information to make intelligent decisions to switch to the network that best suits the user's QoS and at the same time keep the network load balanced, energy efficient, and cost effective. As such, this traditional approach of HetNet is difficult to scale and lacks flexibility for either resource sharing or failure recovery, and therefore limited in terms of overall efficiency.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In an aspect of the disclosure, a system for controlling a network is provided. The system may include a circuit configured to provide interface support to a plurality of remote radio heads (RRHs). Each RRH of the plurality of RRHs may be configured to support multiple RATs (multi-RAT). The system may include a controller configured to control the circuit and the plurality of RRHs. The circuit may be connected to each RRH of the plurality of RRHs via one or more respective fronthaul links.

In one embodiment, the circuit may be created using a virtualization engine running on a cluster of servers with a plurality of hardware accelerators. In one embodiment, the circuit may be reconfigurable to support adaptive signal processing and sampling of the plurality of RRHs. In one embodiment, the controller may control the circuit and the plurality of RRHs based on statistical information inferred from the data traversing through the circuit and the real time network state information of the network. In one embodiment, the controller may be configured to control a plurality of circuit instances in a circuit pool. The plurality of circuit instances may include the circuit.

In one embodiment, the system may further include an access gateway configured to support machine-to-machine (M2M) communications. In one embodiment, the access gateway may allocate an Internet Protocol (IP) prefix to a mobile terminal device from a pool of prefixes managed by the access gateway. In one embodiment, the access gateway may be connected to a caching storage. The controller may be configured to track content demands of a plurality of mobile terminal devices to make caching decisions for the caching storage. In one embodiment, the circuit may include a flow splitter configured to split a traffic flow between the access gateway and a Packet Data Network (PDN) gateway. The flow splitter may be further configured to split the traffic flow among available RATs.

In one embodiment, the network may operate with a plurality of RATs over a plurality of carrier frequencies. In one embodiment, the circuit may be further configured to send a first plurality of digital signals to the plurality of RRHs and receive a second plurality of digital signals from the plurality of RRHs. In one embodiment, the circuit or the controller may be configured to determine an optimal sampling frequency for a RRH, and send the optimal sampling frequency to the RRH to set variable-rate sampler parameters for the RRH. In one embodiment, the controller may be configured to manage radio resources for the plurality of RRHs. The radio resources may include time-frequency blocks and RATs. In one embodiment, the controller may determine a split of protocol layers of a RAT between the circuit and a RRH based on delay requirement of the RAT. In one embodiment, the circuit may be configured as a baseband circuit.

In another aspect of the disclosure, a method, a computer-readable medium, and an apparatus for controlling a network are provided. The apparatus may analyze collected data including structured and unstructured data sets generated by communications between different components of the network. The apparatus may perform flow combining and splitting at a circuit based on the analyzing. The circuit may be configured to provide interface support to a plurality of RRHs. Each RRH of the plurality of RRHs may support multiple RATs.

In one embodiment, the apparatus may further adapt caching function and M2M flow at a controller based on the analyzing. The controller may be configured to control the circuit and the plurality of RRHs. The circuit may be connected to each RRH of the plurality of RRHs via one or more respective fronthaul links.

In one embodiment, the apparatus may further assign power and frequency resources at the plurality of RRHs and the circuit based on the analyzing. In one embodiment, to assign power and frequency resources, the apparatus may determine an optimal sampling frequency for a RRH, and send the optimal sampling frequency to the RRH to set variable-rate sampler parameters for the RRH.

In yet another aspect of the disclosure, an apparatus for controlling a network is provided. The apparatus may include a memory and at least one processor coupled to the memory. The at least one processor may be configured to analyze collected data including structured and unstructured data sets generated by communications between different components of the network. The at least one processor may be configured to perform flow combining and splitting at a circuit based on the analyzing. The circuit may be configured to provide interface support to a plurality of RRHs. Each RRH of the plurality of RRHs may support multiple RATs.

In one embodiment, the at least one processor may be further configured to adapt caching function and M2M flow at a controller based on the analyzing. The controller may be configured to control the circuit and the plurality of RRHs. The circuit may be connected to each RRH of the plurality of RRHs via one or more respective fronthaul links.

In one embodiment, the at least one processor may be further configured to assign power and frequency resources at the plurality of RRHs and the circuit based on the analyzing. In one embodiment, to assign power and frequency resources, the at least one processor may be configured to determine an optimal sampling frequency for a RRH, and send the optimal sampling frequency to the RRH to set variable-rate sampler parameters for the RRH.

To the accomplishment of the foregoing and related ends, the one or more aspects include the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

DETAILED DESCRIPTION

Figures 1A, 1B:
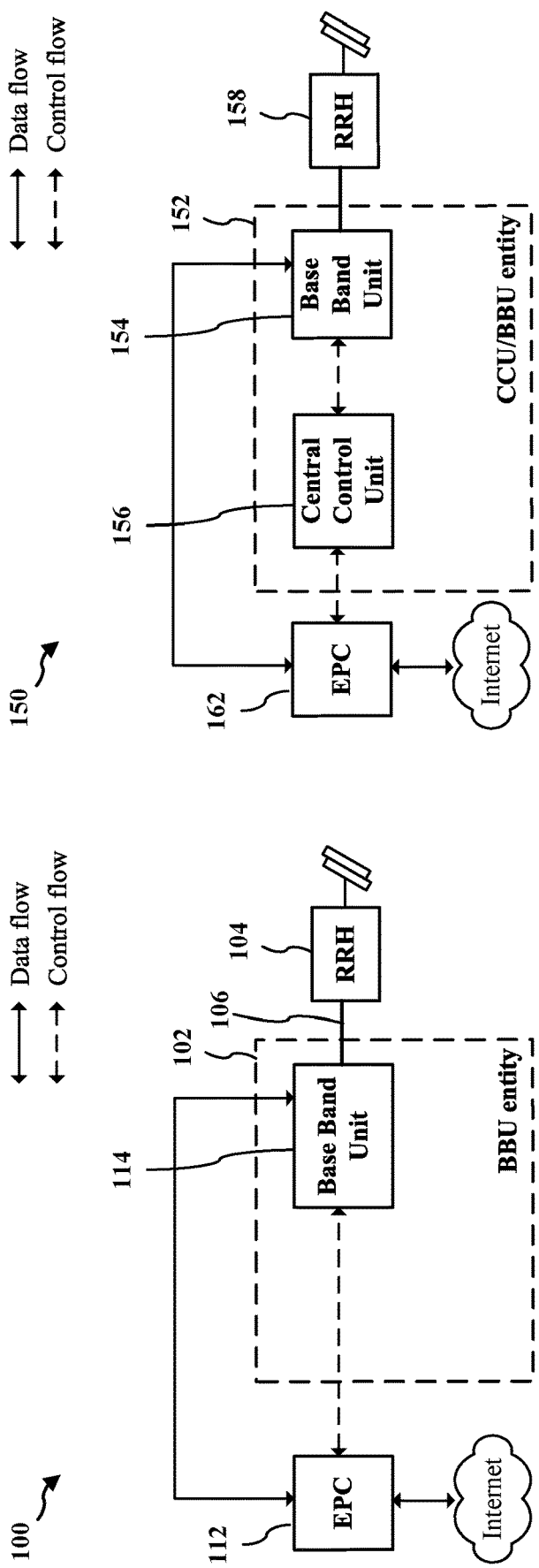
FIG. 1A is a diagram illustrating an example of a C-RAN.
FIG. 1B is a diagram illustrating an example of a software defined implementation of C-RAN.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of wireless communication systems will now be presented with reference to various apparatus and methods. The apparatus and methods will be described in the following detailed description and illustrated in the accompanying drawings by various blocks, components, circuits, processes, algorithms, etc. (collectively referred to as "elements"). The elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media may include a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

In one embodiment of the disclosure, an all-digital transceiver architecture to support heterogeneous network (HetNet) is provided. The architecture may operate with multiple RATs over multiple spectrums. In one embodiment, a CCU and a BBU may be connected to multiple general-purpose RRHs through high speed fronthaul links.

In some embodiments, each RRH may digitize the received radio signal and transfers the digitized signal to the BBU through the fronthaul link for centralized processing. The RRH may also convert the digital signals generated at the BBU and transferred through the fronthaul to analog signals for transmission to the UEs. Three RRH designs will be described below, namely, the full-band Nyquist rate (FBNR) sampling-based architecture, the multi-band Nyquist rate (MBNR) sampling-based architecture, and the multi-band sub-Nyquist (MBSN) sampling-based architecture. All the three RRH architectures are capable of operating at multiple frequency bands, and transparent to the RAT in each frequency bands. Online re-configuration may be supported to adapt to changes in the active frequency location, RAT, network load, mobility management, and quality of service (QoS)/quality of experience (QoE) requirements. This on-line reconfiguration is enabled by the software-defined implementation of the BBU, which may be created using virtualization engine running on a general purpose cluster of servers with the necessary application specific integrated circuit (ASIC) based hardware accelerators. This reconfiguration capability enabled by the software-defined BBU makes the HetNet architecture of some embodiments easy to support "forward compatibility" with new spectrums and RATs without major changes to the deployment. In some embodiments, a RRH may also be referred to as a remote radio unit (RRU).

In some embodiments, the CCU may make use of both the statistical information inferred from the data traversing through the BBU and the real time network state information (NSI), including the frequency occupancy, device state information (DSI), as well as channel state information (CSI), to control the BBU and the RRH. This centralized control using the global view of the network enables an efficient cognitive learning and decision making to manage the networks, systems, devices, and resources, helping to ensure that the network is operated in the most spectrally and energy efficient manner. In addition, as the CCU may control multiple BBU instances in the BBU pool in some embodiments, the structure facilitates better flow control through link aggregation. Such embodiments may enable more effective caching as well as any content from any of the BBU can be cached regardless of the RAT that is used to transmit the content. Furthermore, a M2M gateway is introduced to more efficiently support the M2M communications, forecast to form an essential part of the 5G network. This is possible with the availability of the global view of the network, as virtually any time-frequency resources can be utilized for the M2M communication as long as they are not currently used.

A number of practical challenges in implementing some embodiments are addressed. The practical challenges include the fronthaul rate reduction technique by adaptive sampling method at the RRH, efficient flow management to control the network traffic for multiple RATs flowing through different RRHs, the technique to use big data analytics for better network, system, and device management, more efficient resource utilization across all the RATs and resource matching with the Quality of Services (QoS), and more efficient content caching. The inclusion of M2M support may help avoid congestion at the core network (CN). A hybrid RRH architecture is introduced to accommodate both the delay-critical connectivity and the normal traffic, in order for the normal traffic to benefit from the thin RRH structure and at the same time to meet the protocol's latency requirement. In summary, the architecture of some embodiments provides a cost-efficient and future-proof solution for HetNet with multi-RAT and multi-spectrum capability, providing a scalable, agile, and fast-adapting solution for diverse and changing user requirements.

Some embodiments provide a general purpose RRH capable of supporting multiple radio access technologies and multiple spectrums. This flexibility makes the solution scalable and adaptive to the changes in user demand, and the corresponding RAT and resource allocation.

The all-digital architecture of some embodiments is future-proof, enabling accommodation of new spectrums and new RATs without replacing the existing RRHs, but only adding new processing units in the central BBU and upgrading the control mechanism in the CCU. Also, the all-digital architecture may benefit from high fidelity signals, reducing the impairments that are inherent to analog systems, such as the I/Q imbalance, carrier frequency clock drift, phase noise, etc.

In some embodiment, adaptive signal processing and sampling mechanism is provided to keep a moderate fronthaul rate requirement. In some embodiments, centralized control and baseband processing allows control plane and user plane decomposition, hence achieving efficient resource, mobility and network management, as well as resource pooling and scheduling.

In some embodiments, cognitive learning capability in the CCU may make use of big data analysis and inference for network, system, device, and resource management. The knowledge of the global network flow may also enable better caching strategy, making use of the traffic from all RATs in the network.

Some embodiments may support M2M traffic through a dedicated gateway, which separates the M2M traffic from the conventional user traffic, hence reducing the congestion at the core network. The availability of the global view of the network may also allow for M2M devices to have better access by opening more time-frequency resources to be available to M2M devices.

C-RAN (Centralized Radio Access Network or Cloud RAN) may be a promising architecture to address some of the issues of HetNet. FIG. 1A is a diagram illustrating an example of a C-RAN 100. In the example, a central controller 102 manages multiple RRHs 104 with possibly different RATs via fronthaul network 106. The central controller 102 includes a BBU 114. The BBU 114 may send and receive packets to and from an Evolved Packet Core (EPC) 112. The BBU 114 may connect with the RRHs 104 via the fronthaul network 106.

There are several benefits from this centralized architecture, such as agility, fast service delivery, cost savings, and improved coordination across RRHs. By having a holistic view of the network, better resource allocation can be achieved. In addition, reduction in CAPEX (Capital Expenditure) and OPEX (Operational Expenditure) is possible. Since the baseband processing can be performed at the central controller 102, the RRH 104 may become very simple hence can be installed easily at building rooftops or lamp posts; correspondingly the cost of site acquisition for RRH installation may be significantly reduced. The OPEX saving from reduced electricity bill and maintenance cost can therefore be achieved. Furthermore, in terms of network reliability, the central controller may be implemented as cloud service, whereby baseband processors are virtualized to form a BBU pool running on a general purpose cluster servers with the necessary ASIC-based hardware accelerator.

FIG. 1B is a diagram illustrating an example of a software defined implementation of C-RAN 150. In this example, the central controller 152 may include a CCU 156 in addition to a BBU 154. The BBU 154 may send and receive packets to and from an EPC 162. The BBU 154 may connect with RRHs 154 via fronthaul links. Such architecture may allow for quick recovery in the event of failure, and provides easy network scalability. Statistical multiplexing is also made possible by the centralized architecture, in which several sites with different peak traffic time (e.g. workplace and home residence) can be managed by the same BBU pool, resulting in a more stable network-wide performance.

In the context of LTE-Advanced, C-RAN has become increasingly relevant for its support to the features that require coordination, such as advanced interference control techniques via enhanced Inter-Cell Interference Coordination (eICIC) and Coordinated Multipoint (CoMP), as well as throughput enhancement via carrier aggregation. These features may benefit from the increased processing power at the BBU, and may leverage on global view on the resource allocation at the CCU 156.

A traditional RRH is designed for a particular RAT in its specific band. This single mode RRH is favorable to limit the fronthaul data rate, but it lacks flexibility. In the event that a new RAT is to be deployed, all the RRHs will have to be upgraded. This can be costly considering that they are installed in large number. For the case of HetNet where multiple RATs are present in the network, the number of single mode RRHs can be very large, causing the fronthaul cabling to be difficult and messy. Another disadvantage of having single mode RRHs is that although the C-RAN processing is centralized, the management of different RAT is performed individually; hence different networks are operating in silos with minimum interaction.

Systems with inter-RAT coordination may be capable of accelerating the download speed at the mobile node. With more RATs available in the network, it is expected that an even more significant benefit can be unlocked by having tighter interaction among different RATs. A new challenge, however, is introduced to the flow control which now has to make use of the available information of the global network state to distribute the traffic adaptively across different RATs, hence more complex.

Another benefit from having this centralized architecture is the availability of information on the entire network state, converging into one form of big data. Big data has pervasive application in human society, such as government, climate, finance, and science. For examples, big data may limit the spread of epidemics and maximize the odds that online marketing campaigns go viral, identify trends in financial markets, visualize networks, understand the dynamics of emergent social-computational systems, as well as protect critical infrastructure including the Internet's backbone network, and the power grid. Therefore, the big data can be a key enabler for 5G realization. Frameworks have been introduced to support self-organization network (SON) using big data, which are focusing on dynamic network management. On the other hand, network diagnosis framework has been proposed to detect abnormality of networks and manage the networks. However, most traditional frameworks using big data have been designed mainly for homogeneous network not for HetNet. With the all-digital architecture of some embodiments where the RRH supports multiple RATs, even more information may be collected and inter-RAT network optimization may be better facilitated.

IP mobility support is an important feature of wireless networks. The traditional approach to handle user mobility is to use IP mobility by routing all cellular traffic through the Packet Data Network Gateway (P-GW). This implementation is simple but has some limitations for 5G communications. For example, the stringent end-to-end transmission delay or latency in 5G may be difficult to meet due to the data path through the P-GW. There is also additional load of backhaul, especially for serving large number of M2M devices or ultra-high speed RATs. In addition, network reliability is reduced due to the introduction of a single point of failure, which is the P-GW. In some embodiments, to overcome the aforementioned issues, an access gateway (GW) may be placed in the C-RAN, as shown in FIG. 2.

Figure 2:
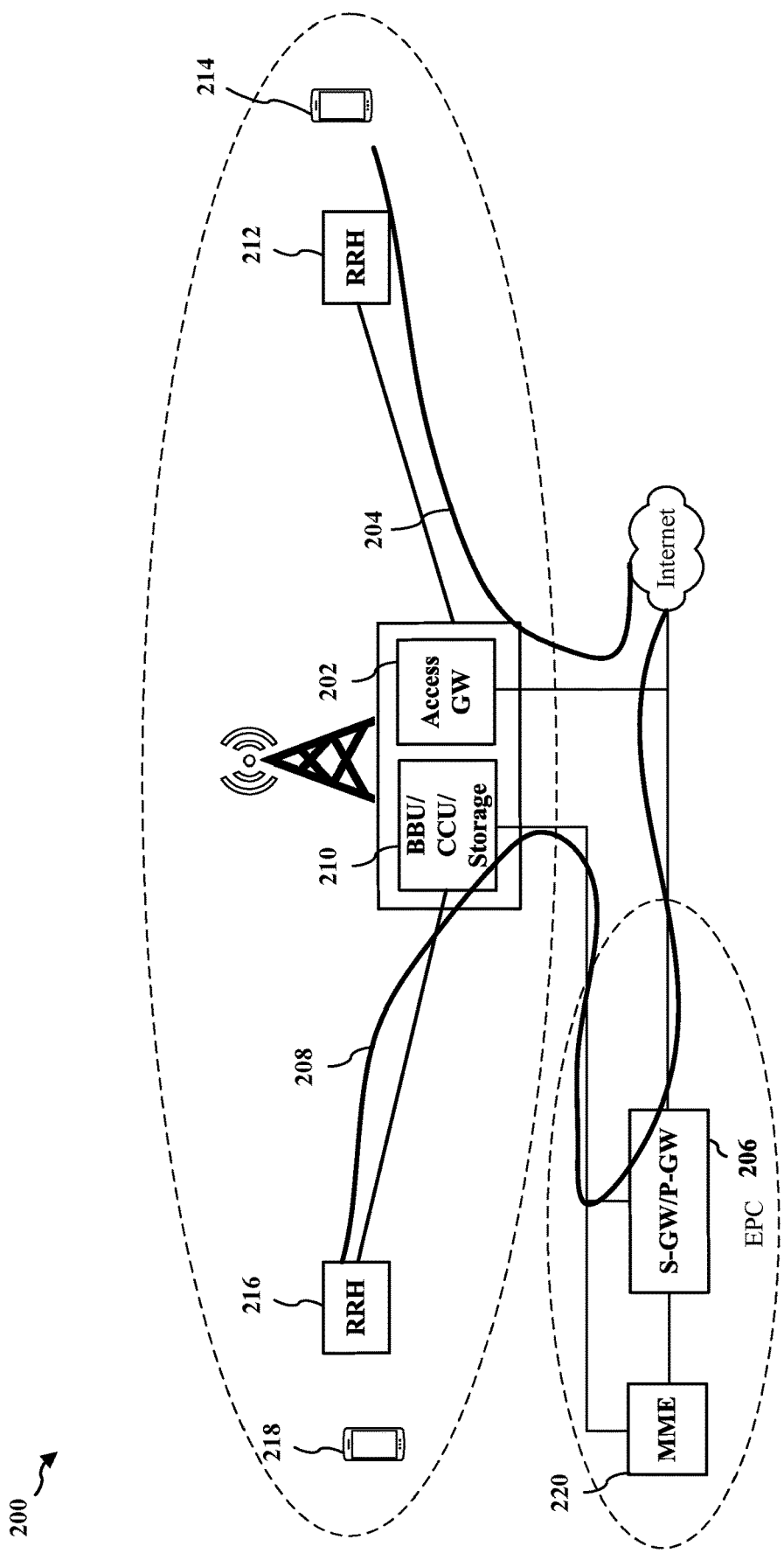
FIG. 2 is a diagram illustrating an example of an architecture in which an access gateway is placed in the C-RAN.

FIG. 2 is a diagram 200 illustrating an example of an architecture in which an access gateway 202 is placed in the C-RAN. In the example, the IP traffic originated from mobile terminal device 218 may be received at RRH 216 and flow to the internet via the BBU/CCU/Storage unit 210, the P-GW 206 along path 208. The P-GW 206 may be connected to a Mobility Management Entity (MME) 220. However, the IP traffic originated from mobile terminal device 214 and received by RRH 212 may flow to the internet via the access GW 202 along path 204, instead of going through the usual P-GW 206. The access GW 202 may allocate an IP address/prefix to the UE from its own pool of prefixes. The access GW 202 may ensure the continued use of that IP address for ongoing IP sessions, with the help of a forwarding tunnel between itself and either the UE or the other access GW. The anchoring is terminated as soon as the last flow using the anchored IP address terminates.

Figure 3A:
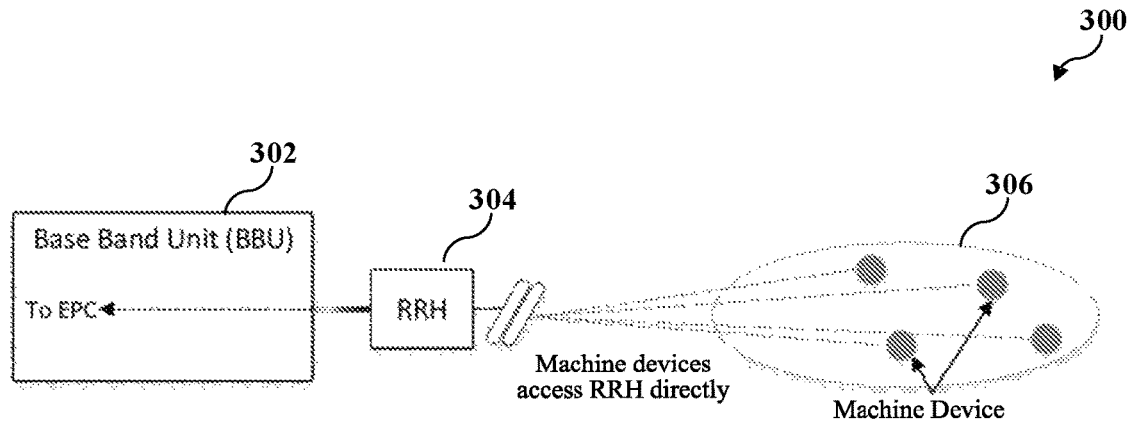
FIG. 3A is a diagram illustrating an example of M2M communications via cellular network without a remote M2M gateway.

FIG. 3A is a diagram 300 illustrating an example of M2M communications via cellular network without a remote M2M gateway (M2M-GW). In this example, a plurality of machine devices 306 may access an RRH 304 directly. The RRH 304 is connected to a BBU 302.

Figure 3B:
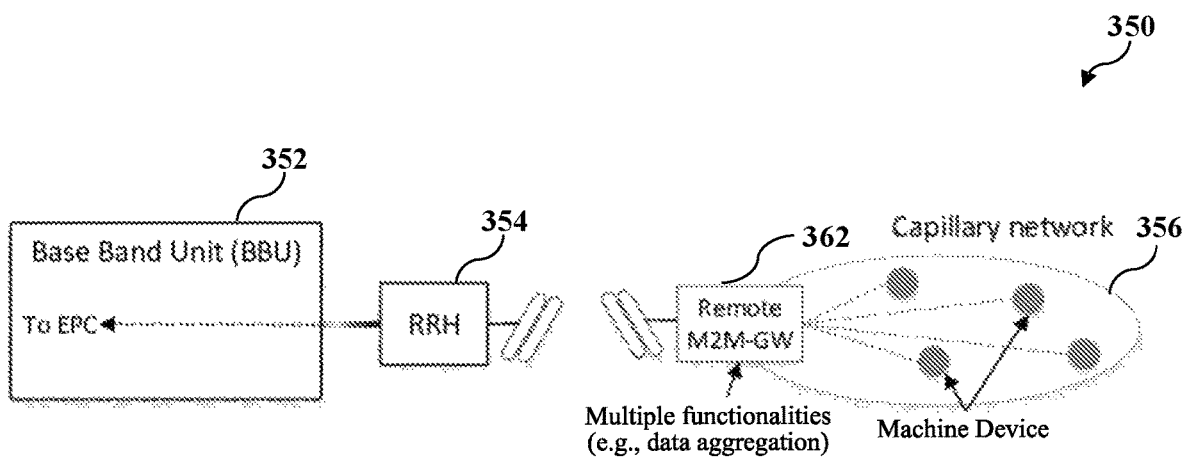
FIG. 3B is a diagram illustrating an example of M2M communications via cellular network with a remote M2M gateway.

FIG. 3B is a diagram 350 illustrating an example of M2M communications via cellular network with a remote M2M gateway (M2M-GW) 362. In this example, a plurality of machine devices 356 may access an RRH 354 via a remote M2M-GW 362. The RRH 354 is connected to a BBU 352. The remote M2M-GW 362 concentrates the traffic from many devices and transmits it to the M2M server via the evolved packet core network (EPC). Although the M2M-GW 362 manages to lighten the load over the fronthaul, the traffic still needs to transverse through the EPC.

In summary, in order to support the 5G realization, the problems with the traditional network architecture are listed as follows:
Single-mode RRH complicates fronthaul connectivity and limits scalability;
Flow control is individually managed by each RAT;
Loose coordination between RATs;
Under-utilization of the abundant network-wide state information at the central station;
Insufficient support for M2M communication.

In one embodiment, an all-digital unified software-defined cognitive HetNet transceiver design that integrates the various component networks with different RATs in different frequency bands is provided. The system of such an embodiment may compose of three parts: (i) the central control unit (CCU) and central baseband unit (BBU) which handle the coordination and cooperation of the component networks and the transmit and receive processing; (ii) the "thin" RRHs which in the transmit chain convert the digital signals generated at the BBU to analog signals and transmit to the users, while in the receive chain receive the radio signals from the users and digitize the radio signals before transferring the digitized signals to the BBU; and (iii) the high-speed fronthaul links connecting the RRUs and the CCU/BBUs. Different from the traditional design, in which a separate hardware is needed at the RRU for transmitting and receiving signals of one RAT in one spectrum band, the RRU of some embodiments uses a unified single architecture to support multiple RATs operating in different frequency bands. A digital interface may be adopted between the RRU and the fronthaul, fetching the multi-RAT signals between the central unit and the remote units. The advantages of this all-digital architecture include higher signal fidelity and immunity to analog impairments such as I/Q imbalance and oscillator phase noise. These benefits of placing the digitizer circuit closer to the antenna have also been recognized in the context of Software Defined Radio, and thanks to the development of silicon technology over the past decade, this concept is now feasible to do in practice. The unified architecture of some embodiments may also allow multiple RATs running multiple protocols to share the same hardware platform, therefore it will be able to support the scheduling and resource allocation within each component network as well as across different component networks much more effectively, as controlled by the CCU. In addition, the architecture of some embodiments may also enable context derivation for the network and the users by making use of the data traversing at the central unit, hence supports high-efficiency context-aware resource and network management. By having this global view of the network status and the ability to centrally controlling different RATs on each of the RRH modules, substantial benefit may be attained in achieving better flow control, more effective inference capability for resource allocation and caching strategy, as well as a better support for M2M communication.

Figure 4:
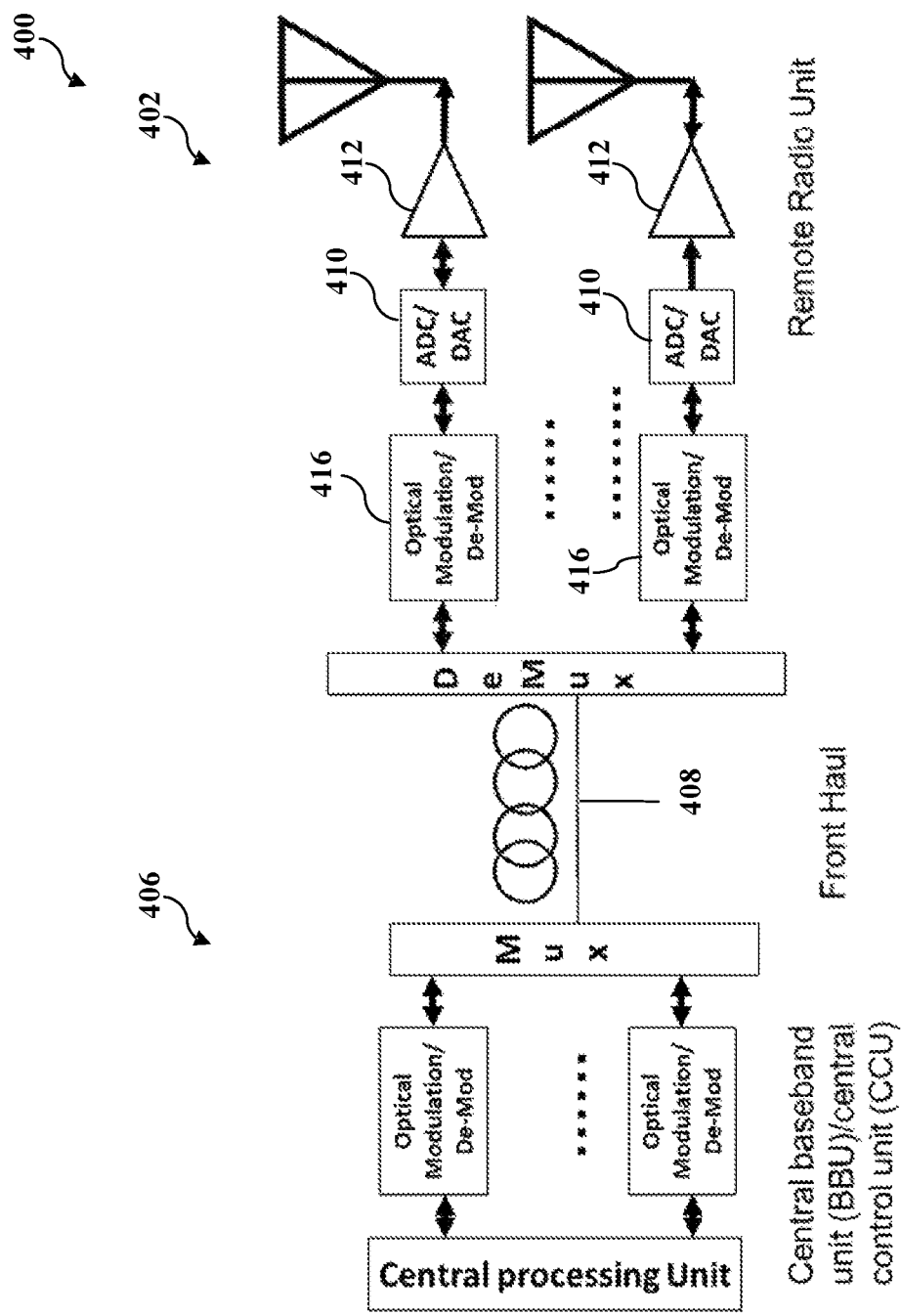
FIG. 4 is a diagram illustrating an example of an all-digital HetNet transceiver system.

FIG. 4 is a diagram illustrating an example of an all-digital HetNet transceiver system 400. In the example, the all-digital HetNet transceiver system 400 consists of three parts:
The RRU or RRH 402
The fronthaul connection 408
The BBU and CCU 406

For uplink communication, the RRU 402 may need to capture the signals in the bands of interests, e.g., the allocated frequency bands for the third generation (3G) and fourth generation (4G) cellular systems, the Wi-Fi 2.4 GHz and 5 GHz bands, etc., amplify the signal amplitude (e.g., at amplifier 412) in order to make optimal use of the dynamic range of the analog to digital converter (ADC) 410, and then digitize the signal (e.g., at optical modulation/demodulation unit 416) for transmission through the fronthaul 408.

Figure 5:
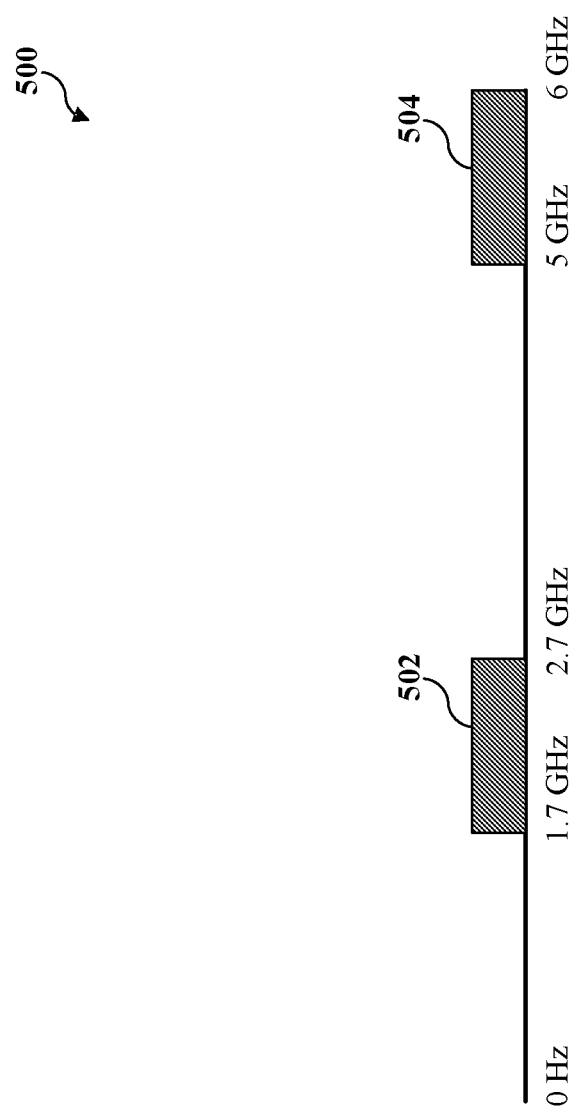
FIG. 5 is a diagram illustrating an example of the spectral occupancy in a scenario of two frequency bands.

To better explain the sampling requirement at the RRU 402, an example scenario with two frequency bands of interest may be considered. FIG. 5 is a diagram 500 illustrating an example of the spectral occupancy for the scenario of two frequency bands. In the example, there are two frequency bands 502 and 504. The frequency band 502 is a 1 GHz band (from 1.7 GHz to 2.7 GHz) where 3G/4G, 2.4 GHz Wi-Fi, and LTE-U reside; and the frequency band 504 is a 1 GHz band (from 5 GHz to 6 GHz) where the 5 GHz Wi-Fi resides.

The conversion from analog to digital signals at a RRU may be implemented with one of the three approaches: single full-band Nyquist sampling, multi-band Nyquist sampling, or multi-band sub-Nyquist sampling.

In single full-band Nyquist sampling, suppose the highest frequency component of interest in the HetNet is F, then the minimum sampling rate of the digitizer will need to be 2F. The radio signals in the frequency range of [0, F] that can be captured by the wideband antenna at the RRU will all be digitized and transported to the BBU/CCU for demodulation and decoding. In the example scenario described in FIG. 5 above, since the maximum frequency component is F=6 GHz, the required minimum sampling rate for the digitizer is 12 giga-samples per second (Gsps).

Figure 6:
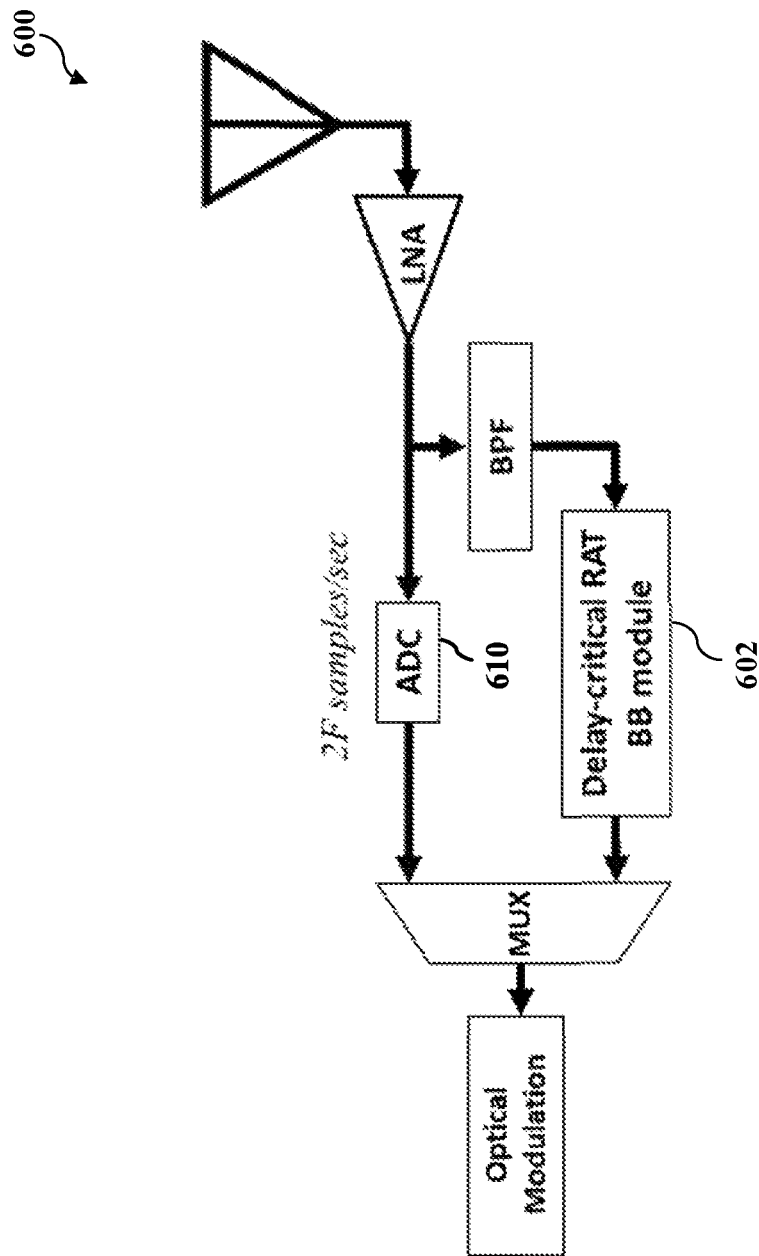
FIG. 6 is a diagram illustrating an example structure of using single full band Nyquist sampling to perform analog-to-digital conversion at an RRU.

FIG. 6 is a diagram 600 illustrating an example structure of using single full band Nyquist sampling to perform analog-to-digital conversion at an RRU. The single full band Nyquist sampling is simple, but needs a very high sampling rate and high resolution analog-to-digital converters (ADC) 610, hence maybe costly.

In FIG. 6, the delay-critical RAT BB module 602 is used to handle the baseband processing of an RAT which requires stringent latency requirement. One example of such RAT is Wi-Fi, which requires an acknowledgement/negative-acknowledgement (ACK/NACK) packet to be sent within the 16 microseconds-long Short Inter-frame Space (SIFS) upon receiving a packet. Such a short duration is not sufficient to incorporate the time needed for the digitized bits to travel from the RRH to the BBU, and again back to the RRH after the receiver processing and the integrity check. Therefore, to meet the stringent delay requirement, an RRH of some embodiments may include the delay-critical RAT BB module 602.

The idea behind multi-band Nyquist sampling is to break the entire bandwidth of F into a number of subbands, and shift the signal frequency for each of the subbands to wideband baseband signal for digitization. Since the bandwidth of each of the frequency bands of interest is smaller, the sampling rate requirement of the ADC is reduced. However, multiple units of ADCs may be needed. It is therefore a design tradeoff between the number of frequency subbands to be digitized, the number of parallel circuits to digitize the received radio signals, and the performance and cost of the ADCs. In the example scenario described above in FIG. 5, there are two bands of interest; hence two branches of digitizer are required. As far as the implementation is concerned, either band-pass filter approach or low-pass filter approach can be used, depending on whether a single wideband antenna or a number of band-pass optimized antennas are used. An additional branch may be needed to implement the baseband processing of the delay-critical RAT due to the same reason explained above in FIG. 6.

Figure 7A:
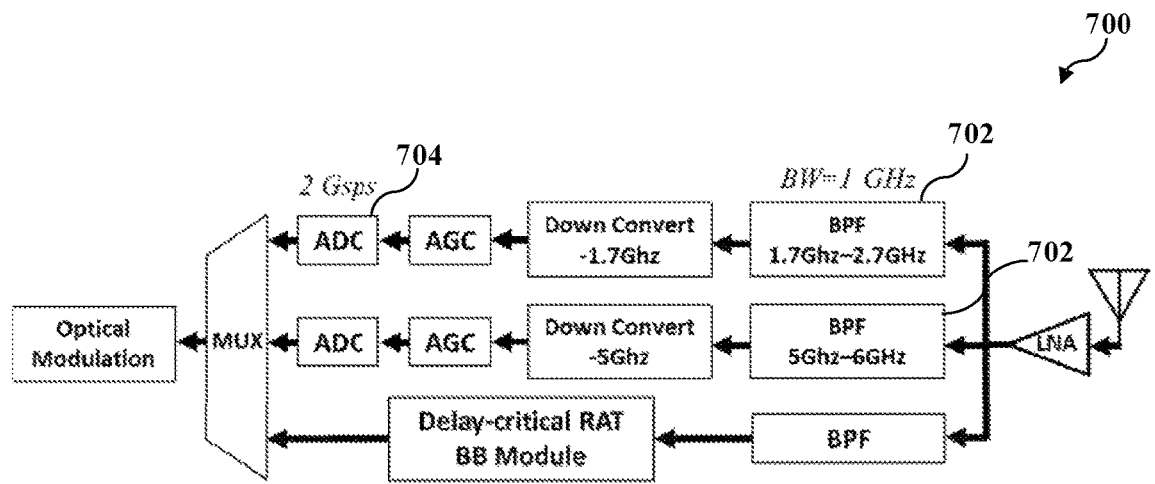
FIG. 7A is a diagram illustrating an example structure of using multi-band Nyquist sampling with band-pass filters to perform analog-to-digital conversion at an RRU.
Figure 7B:
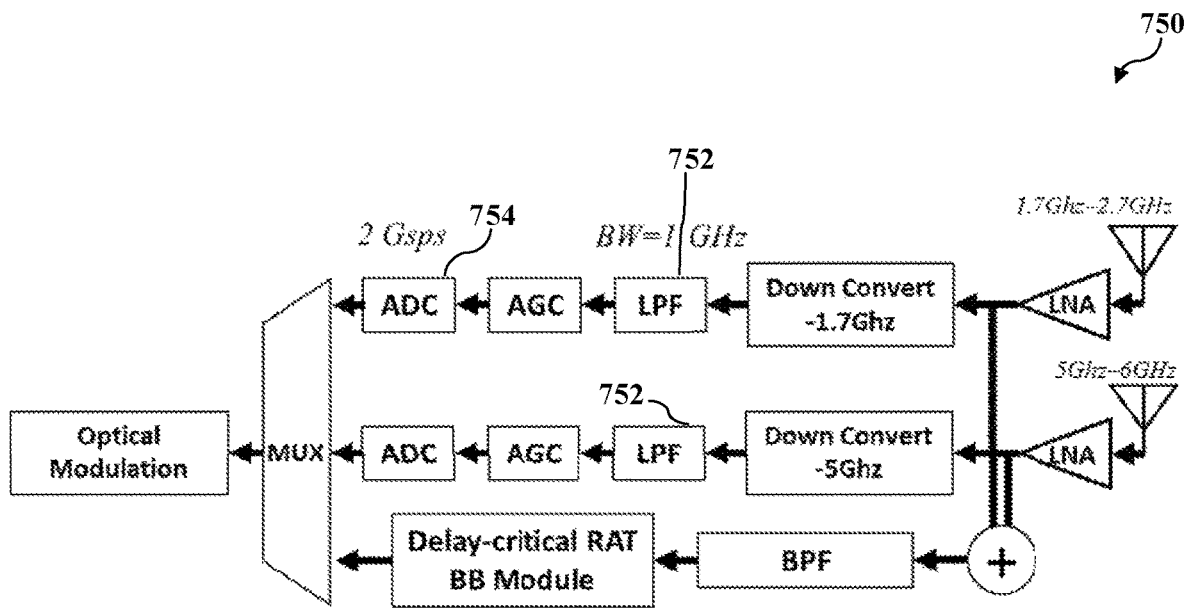
FIG. 7B is a diagram illustrating an example structure of using multi-band Nyquist sampling with low-pass filters to perform analog-to-digital conversion at an RRU.

FIG. 7A is a diagram 700 illustrating an example structure of using multi-band Nyquist sampling with band-pass filters 702 to perform analog-to-digital conversion at an RRU. FIG. 7B is a diagram 750 illustrating an example structure of using multi-band Nyquist sampling with low-pass filters 752 to perform analog-to-digital conversion at an RRU.

Compared with the single full-band Nyquist sampling described above in FIG. 6, the ADC sampling rate (e.g., at ADC 704, 754) in FIGS. 7A and 7B is significantly lower, from 12 Gsps to 2 Gsps in the example. The drawback of multi-band Nyquist sampling described in FIGS. 7A and 7B is the presence of spectral holes that are not captured by the ADC. When some of these spectral holes become important in the future (due to the introduction of new RAT in this spectrum for instance), a new parallel branch may need to be introduced.

In multi-band sub-Nyquist sampling, when the exact spectral occupancy within the band of interest is known, it may be possible to further reduce the sampling rate requirement. The minimum possible sampling rate required for signal reconstruction is defined by Landau rate, and it is equal to the spectral occupancy. This lower bound on the minimum sampling rate can be achieved under the assumption that the signals of interest are appropriately located in frequencies with a certain pattern, and that there is no interference present. When either one of these two conditions is not satisfied, the Landau rate may still be approached, but additional care in choosing the sampling rate may need to be taken, as explained in the following.

Assume that there are $N_s$ signals of interest with the following spectral occupancy:

$$\mathcal{A}^{(i)} = [A_s^{(i)}, A_e^{(i)}], \forall i \in [1 \ldots N_S]$$

In addition, there are $N_i$ interference signals that are present, which are located at the following spectral range:

$$\mathcal{B}^{(i)} = [B_s^{(i)}, B_e^{(i)}], \forall i \in [1 \ldots N_I]$$

The idea is then to choose the sampling rate such that the signals of interest are not overlapping with any other signal components, while allowing the interference signal to overlap with one another. This problem can be formulated into an optimization problem as follows:

$$\min F_s$$

$$\text{s.t. } F_s \geq \sum_i A_e^{(i)} - A_s^{(i)} \quad \text{(Landau rate)}$$

$$F_s \leq \max_i 2|\max(A_e^{(i)}, B_e^{(i)})| \quad \text{(Nyquist rate)}$$

$$\bigcap_i R\text{-Mod}(\mathcal{A}^{(i)}, F_s) = \emptyset \quad \text{(Disjoint condition 1)}$$

$$\left(\bigcup_{i=1}^{N_S} R\text{-Mod}(\mathcal{A}^{(i)}, F_s)\right) \cap \left(\bigcup_{i=1}^{N_I} R\text{-Mod}(\mathcal{B}^{(i)}, F_s)\right) = \emptyset \quad \text{(Disjoint condition 2)}$$

where R-Mod( ) is a range modulo operation, and defined as:

$$R\text{-Mod}(\mathcal{A}, F_s) = \begin{cases} [0, F_s], & \text{if } (A_e - A_s) \geq F_s \\ [\text{mod}(A_s, F_s), \text{mod}(A_e, F_s)], & \text{if } \left\lfloor \frac{A_s}{F_s} \right\rfloor = \left\lfloor \frac{A_e}{F_s} \right\rfloor \\ [\text{mod}(A_s, F_s), F_s] \cup [0, \text{mod}(A_e, F_s)], & \text{if } \left\lfloor \frac{A_s}{F_s} \right\rfloor + 1 = \left\lfloor \frac{A_e}{F_s} \right\rfloor \end{cases}$$

The above optimization problem is a one-dimensional search problem, and it can be solved efficiently using software such as MATLAB.

Figure 8:
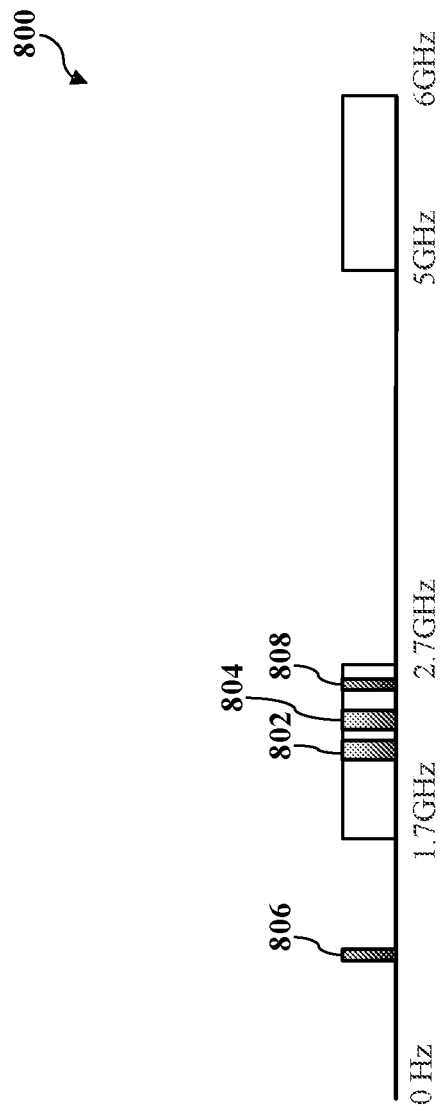
FIG. 8 is a diagram illustrating the frequency occupancy of signals in an example scenario of two signals.

FIG. 8 is a diagram 800 illustrating the frequency occupancy of signals in an example scenario of two signals 802 and 804. Each of the signals 802 and 804 occupies a 20 MHz band, whereby the signal 802 is centered at 2.326 GHz, and the signal 804 is centered at 2.351 GHz. On top of that, there exist interferer signals 806 and 808, the 10 MHz interferer signal 806 centered at 1 GHz, and the 20 MHz interferer signal 808 centered at 2.5 GHz.

Figure 9:
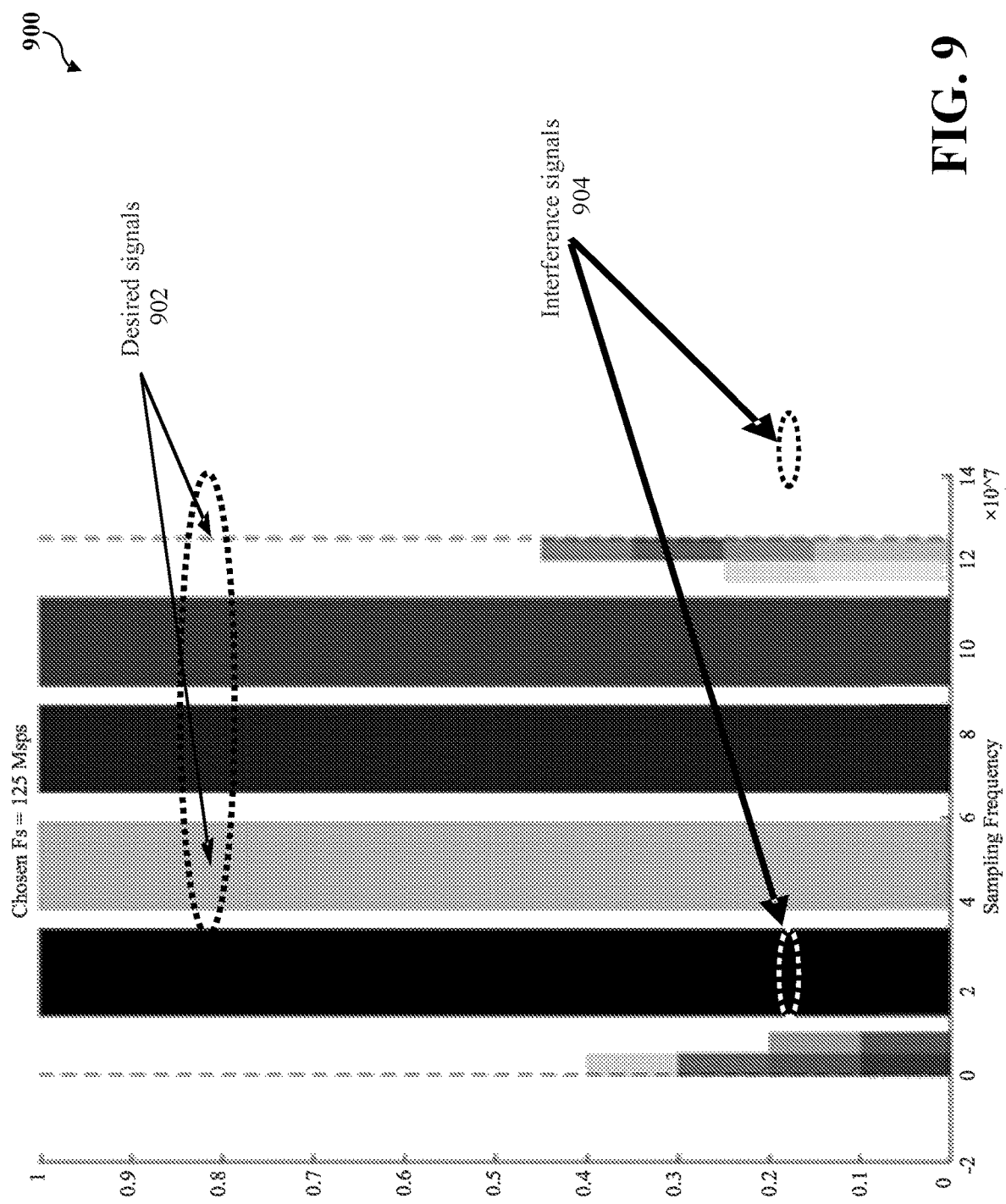
FIG. 9 is a chart illustrating the resulting spectral occupancy after sampling at an optimal rate obtained with the optimization described above.

FIG. 9 is a chart 900 illustrating the resulting spectral occupancy after sampling at an optimal rate obtained with the optimization described above. There are the signals of interest 902, and the interferer signals 904. After solving the optimization problem above, the minimum sampling frequency obtained is $F_s^* = 125$ Msps. It is apparent that the selected sampling frequency places the desired signals 902 into a non-overlapping frequency range, while the interference signals 904 are dumped into a common bin.

Figure 10:
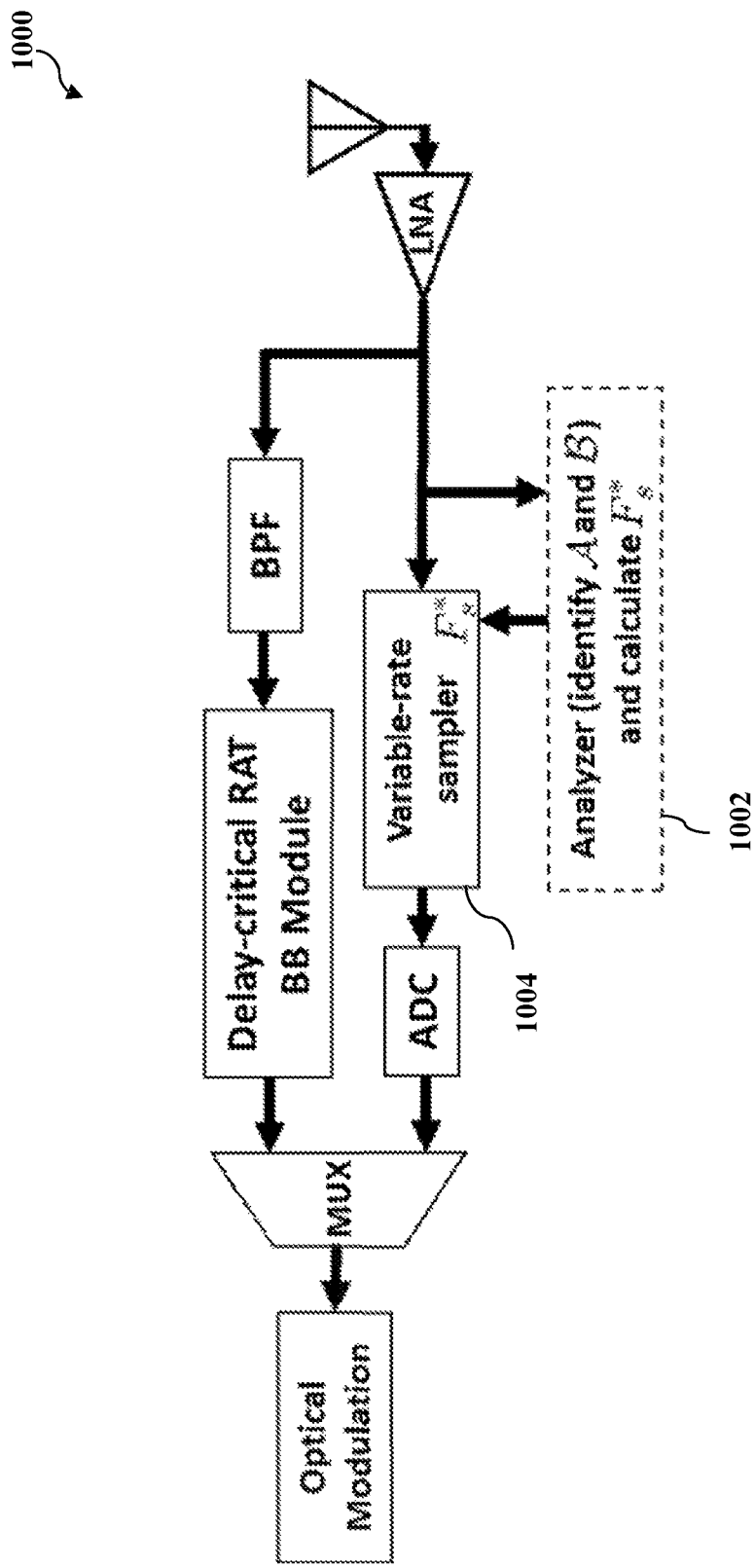
FIG. 10 is diagram illustrating an example structure of using multi-band sub-Nyquist sampling to perform analog-to-digital conversion at an RRU.

FIG. 10 is diagram 1000 illustrating an example structure of using multi-band sub-Nyquist sampling to perform analog-to-digital conversion at an RRU. The main element in this approach is the analyzer unit 1002, which is responsible for identifying the desired signal components, and the interference components, respectively. When a new RAT is introduced, the analyzer unit 1002 may be able to take into account the new signal component and update the optimal sampling frequency. Adjustment to the selected sampling frequency to match the sampling rate supported by commercial ADC may also be needed. The sampling frequency determined by the analyzer unit 1002 may be provided to the variable-rate sampler 1004, which may adjust the sampling rate accordingly.

As an alternative approach, the information on the set of frequency bands of interest may be obtained from the CCU/BBU unit along with the frequency bands of the interferers. In this case, the analyzer unit 1002 may not be needed at the RRH. The function of the analyzer unit 1002 may be supported by the CCU/BBU, which may send the pre-calculated optimal sampling frequency to the RRH to set the variable-rate sampler parameters of the RRH.

For downlink transmission, an RRH may convert the digital signal generated from the BBU and transported from the fronthaul to analog signals, amplify the signal amplitude by a power amplifier (PA), and then transmit the amplified signal to the receivers. Corresponding to the three approaches described above for converting the analog signal to digital signal in the uplink, the digital to analog conversion (DAC) of the downlink signal can be done in three different approaches: the direct conversion to RF band approach, the multi-band conversion via intermediate frequency approach, and the pure baseband analog conversion approach. The same scenario with two bands of interest as illustrated in FIG. 5 may be considered, whereby each band is 1 GHz wide, and the maximum frequency component is 6 GHz.

Figure 11:
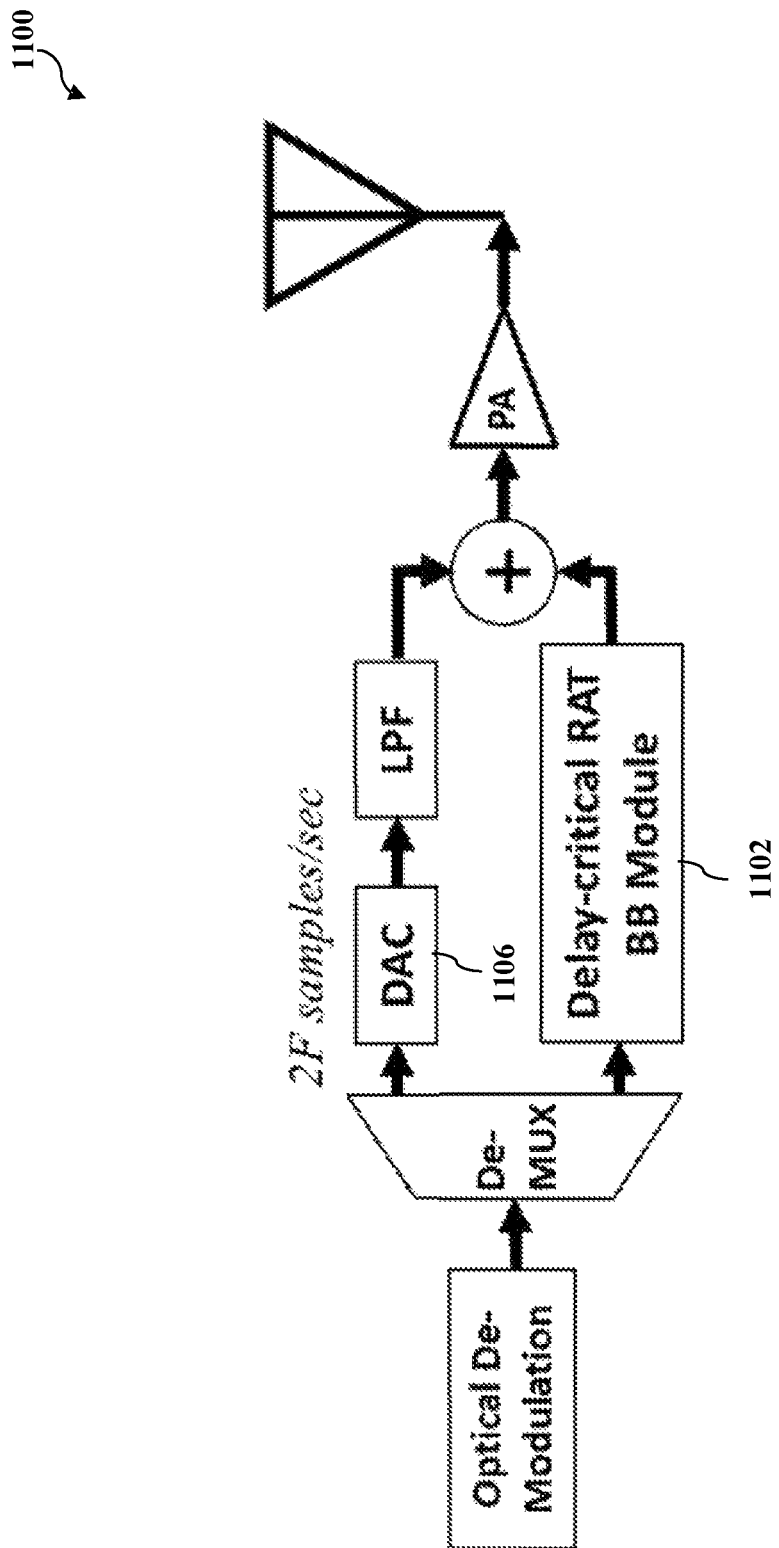
FIG. 11 is a diagram illustrating an example structure of using the direct conversion approach to perform digital-to-analog conversion at an RRU.

In the direct conversion to radio frequency (RF) band approach of downlink signal DAC, the BBU may generate the RF carrier-modulated digital signal before sending it through the fronthaul link. FIG. 11 is a diagram 1100 illustrating an example structure of using the direct conversion approach to perform digital-to-analog conversion at an RRU. Depending on the highest frequency component, the sampling rate and the corresponding fronthaul link capacity requirement may be very high. For the example with 6 GHz highest frequency component, a 12 Gsps DAC 1106 may be needed to convert the digital signal directly to the desired RF band. The Delay-critical RAT BB module 1102 may be responsible for processing the information packets from the BBU pertaining to time-critical RATs such as Wi-Fi, and performing tasks such as ACK/NACK packet generation and transmission, carrier sensing, and hybrid ARQ, etc.

Similar to the multi-band Nyquist sampling approach for analog to digital conversion described above, in multi-band conversion via Intermediate Frequency (IF) approach for downlink signal DAC, the signals may be grouped into their respective band of interest. In the specific example, the two bands of interests are identified, and the signal components within each band are combined into one digital stream. The idea is for the BBU to apply digital up-conversion on each signal within its band of interest. The up-conversion frequency is chosen to be lower than the final location, and it is within the width of the band of interest. Due to this IF up-conversion, the required sampling frequency is lower than the direct RF conversion described above. In the example scenario described above with reference to FIG. 5, the band of interest is only 1 GHz wide; hence 2 Gsps sample frequency may be sufficient. Each band of interest may generate one bit stream to be sent to the RRH. Multiple streams from multiple bands of interests may then be multiplexed before being sent to the RRH.

Figure 12:
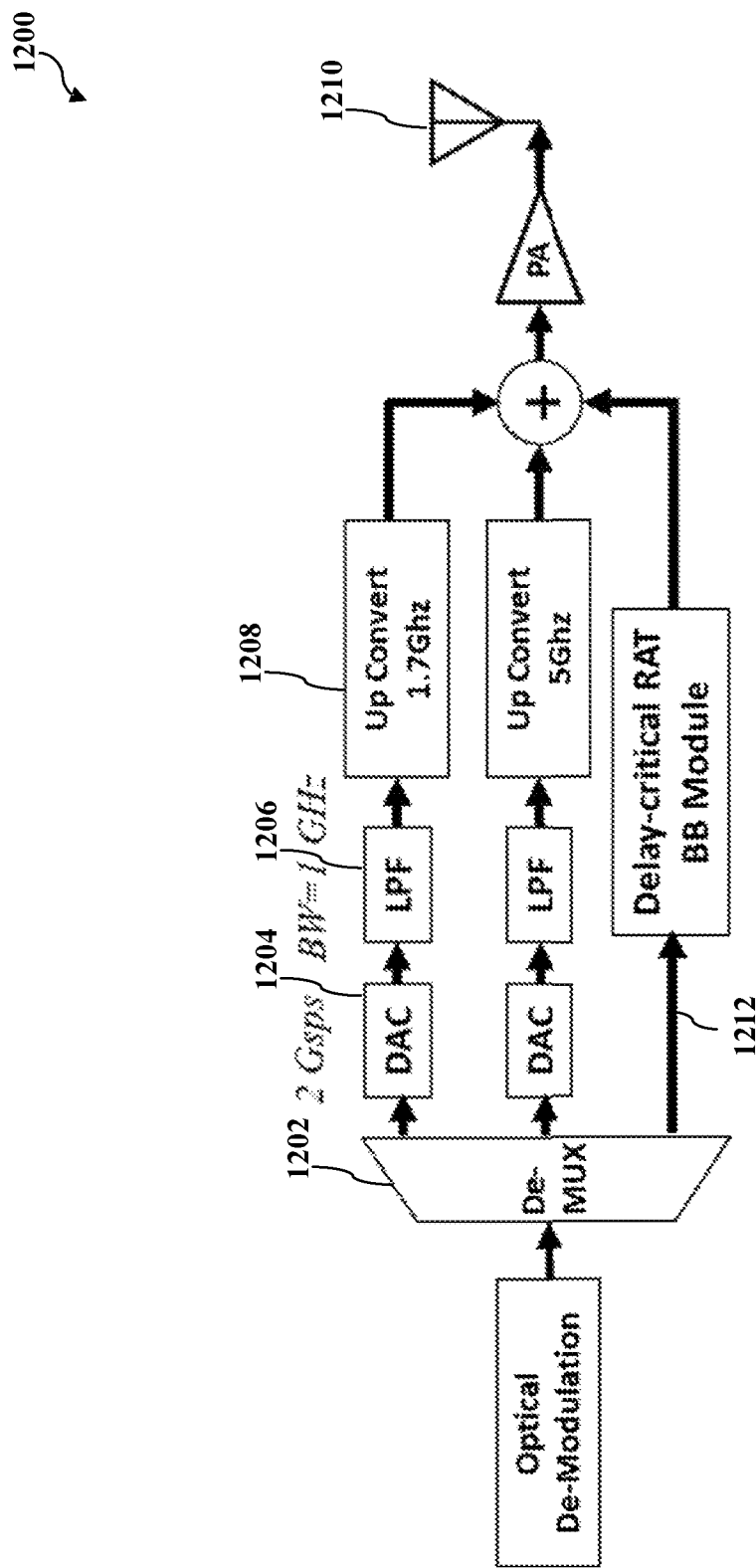
FIG. 12 is a diagram illustrating an example structure of using the multi-band conversion via intermediate frequency approach to perform digital-to-analog conversion at an RRU.

FIG. 12 is a diagram 1200 illustrating an example structure of using the multi-band conversion via intermediate frequency approach to perform digital-to-analog conversion at an RRU. At the RRH, a de-multiplexing (e.g., at de-mux unit 1202) followed by DAC operation (e.g., at DAC 1204) is performed. Correspondingly, a low-pass-filter 1206 may be followed by analog up-conversion (e.g., at up converter 1208) to the respective location of the band of interest. In order to support inter-RRH pre-coding and coordination, the reference frequency used by the up-converters (1.7 GHz and 5 GHz in our case) may be sent directly from the CCU/BBU unit. This will eliminate the frequency offset across different RRHs, which may be needed for coordinated downlink transmission. Depending on the bandwidth of each subband of interest, the transmission of the reference frequency from the CCU/BBU unit may increase the overall front haul rate requirement. After the up-conversion, the output of each branch are combined and amplified before being sent to the antenna 1210 for transmission. In addition, one branch 1212, which is dedicated to process the delay-critical RAT, may be also included and combined with the other signals to be amplified and transmitted.

In the pure baseband analog conversion approach, each individual signal component is sent in its baseband representation, and no up-conversion is performed at the BBU. As such, the required sampling rate is the smallest compared to the two approaches described above with regard to FIGS. 11 and 12. Additional control signal may be needed to inform the RRH the bandwidth and the center frequency of each of the components. Since different signal component may have different bandwidth, their bit stream representation may have different rate. As such, the multiplexing scheme used to combine all the bit streams from the signal components prior to transmission over the fronthaul link may need to be conveyed to the RRH as well.

Figure 13:
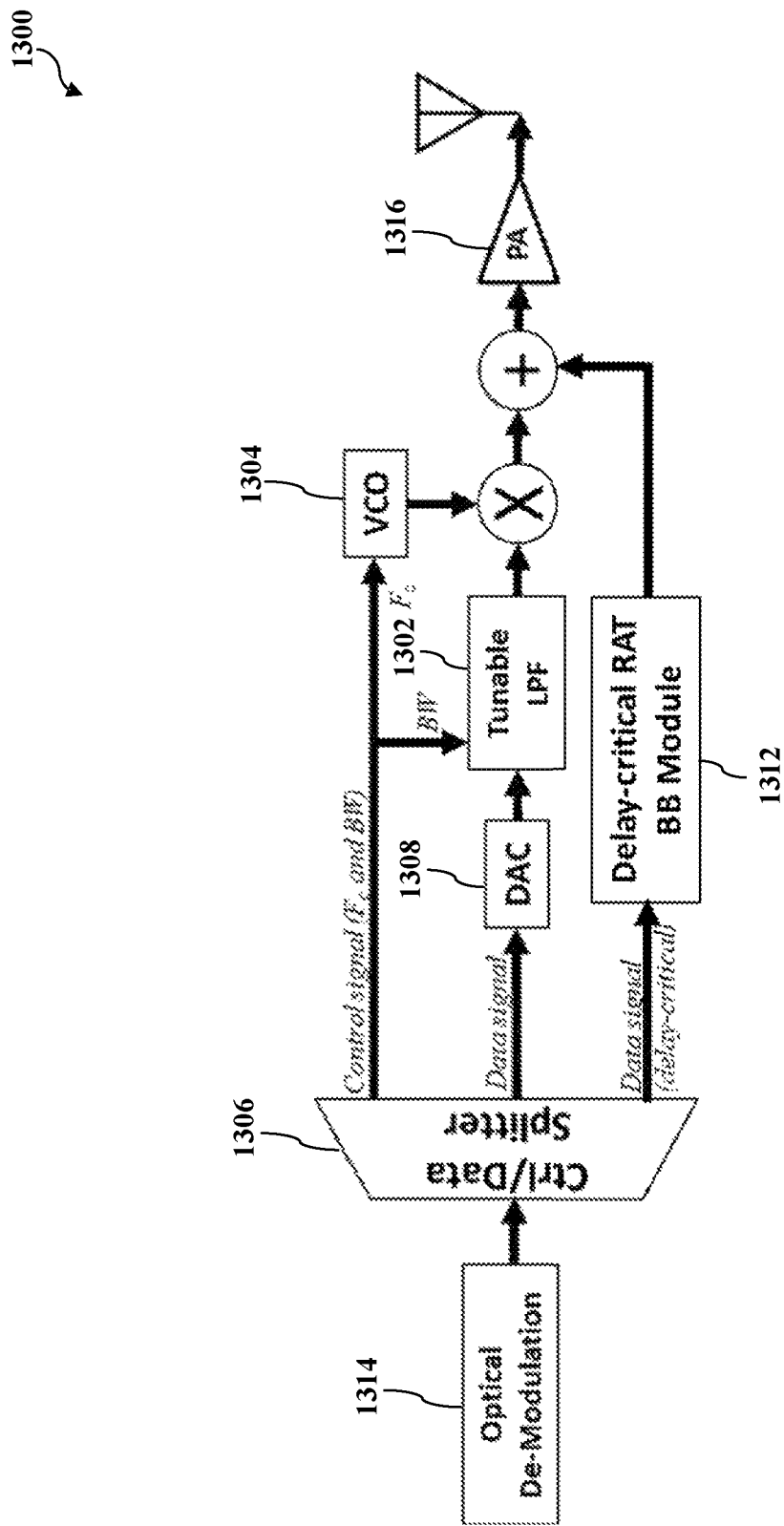
FIG. 13 is a diagram illustrating an example structure of using the pure baseband analog conversion approach to perform digital-to-analog conversion at an RRU.

FIG. 13 is a diagram 1300 illustrating an example structure of using the pure baseband analog conversion approach to perform digital-to-analog conversion at an RRU. At the RRH, each signal component is separately processed, whereby appropriate bandwidth is used for the low pass filter 1302, and the respective center frequency location is used by the Voltage Controlled Oscillator (VCO) 1304 to generate the appropriate carrier frequency for modulation. The control/data splitter unit 1306 may be used to extract the control information containing the center frequency and the bandwidth information from the corresponding data signal which is forwarded as input to the DAC 1308. The delay-critical packets are also extracted by the splitter 1306, which are then processed by the corresponding BB module 1312.

The block diagram given in FIG. 13 assumes that the RRH transmits the different signal component serially. To allow the RRH to transmit multiple signal components simultaneously, multiple branches of the same structure illustrated in FIG. 13 (e.g., between the optical demodulation unit 1314 and the power amplifier 1316) may be needed. The output signals from those branches can then be combined prior to the amplification and transmission.

Figures 14A, 14B:
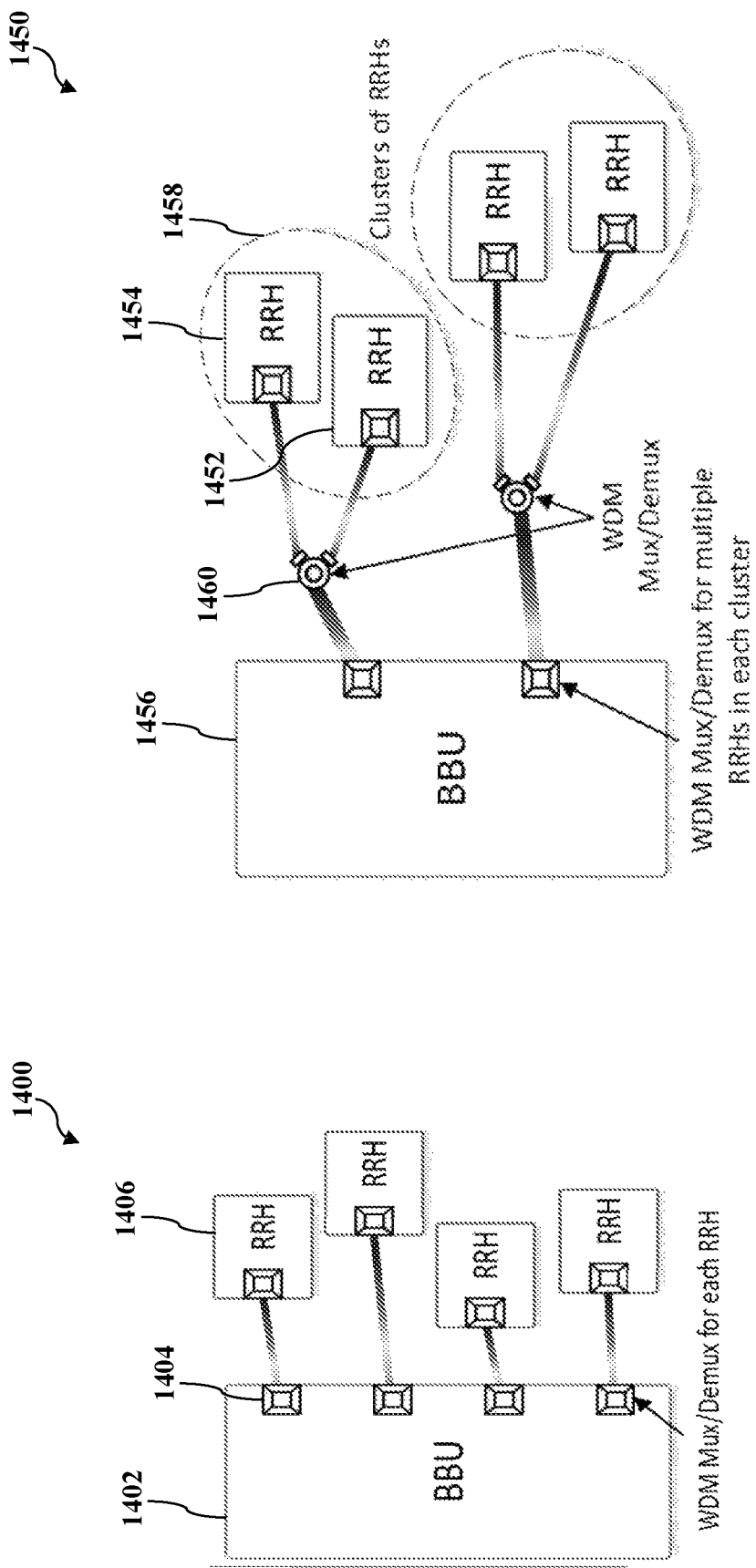
FIG. 14A is a diagram illustrating an example of fronthaul link with individual RRH connection.
FIG. 14B is a diagram illustrating an example of fronthaul link with clustered RRH connection.

A number of solutions may be possible for the fronthaul link to fetch the digital signals between the BBU and the RRH. FIG. 14A is a diagram 1400 illustrating an example of fronthaul link with individual RRH connection. In this example, at the BBU 1402 side, a number of optical ports (e.g., optional port 1404) are implemented, each of which is dedicated for optical-to-electrical (O/E) conversion and electrical-to-optical (E/O) conversion for one RRH (e.g., RRH 1406). Wavelength division multiplexing (WDM) technology may be used to meet the fronthaul capacity requirement.

FIG. 14B is a diagram 1450 illustrating an example of fronthaul link with clustered RRH connection. In this example, multiple RRHs (e.g., RRHs 1452 and 1454), which are geographically close to each other, may be grouped into a cluster (e.g., cluster 1458). At the BBU 1456 side, the digital signal for each RRH is converted to optical signal and those belonging to the same RRH cluster are multiplexed through WDM and transported to that cluster. At each cluster, there is a WDM multiplexer/demultiplexer (e.g., 1460) to forward the signals to their corresponding RRHs within the cluster. Similarly, the digitized received signal at each RRH within the cluster is multiplexed before transporting through the fronthaul to the BBU 1456. This approach may ease the burden to implement dedicated optical port for each RRH at the BBU 1456. However, it may introduce additional delay due to the WDM multiplexing/demultiplexing at RRH cluster side.

Figure 15:
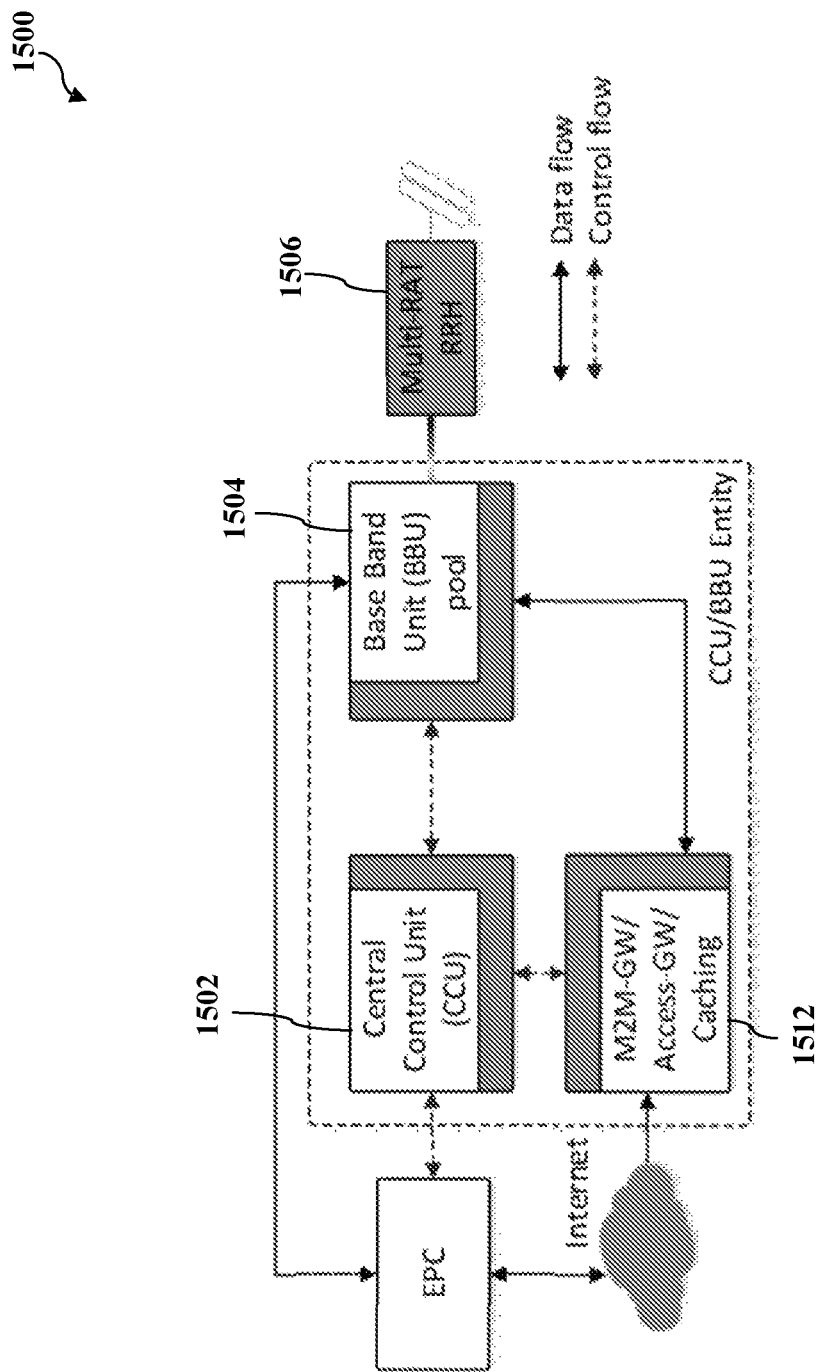
FIG. 15 is a diagram illustrating the interworking of the CCU, BBU, gateways, and multi-RAT RRH.

FIG. 15 is a diagram 1500 illustrating the interworking of the CCU 1502, BBU 1504, gateways 1512, and multi-RAT RRH 1506. The flows of the data plane and the control plane are shown in solid line and dotted line, respectively. For interworking between the CCU/BBU and the multi-RAT RRHs 1506 and interworking between the CCU/BBU and the access GWs 1512, the emphasis of some embodiments is on the CCU 1502 with big data analytic and interference capability, and the M2M GW 1512 for handling M2M traffic.

The CCU 1502 manages the radio resources by making control plane decisions for all the RRHs 1506 in the geographical area. From the network information of the RRHs 1506, the CCU 1502 may be able to maintain a global view of the RAN. This makes it more flexible for the implementation of the radio resource management (RRM) algorithms, matching the right radio resource with the right service demand. In one embodiment, the radio resource may include both the conventional time and frequency blocks and the radio access technologies. Information used by the CCU 1502 may be obtained from the RRH 1506, core network, and UE feedback. The information may be used to make the RRM decisions, mobility management, caching decision, etc. These decisions usually need to be coordinated across the neighboring RRHs, and in some cases involve cooperative processing among neighboring RRHs. The CCU decisions are then passed to the caching storage and the BBU 1504.

The access GW 1512 may be connected to the caching storage. If the content requested is available at the cache, it is obtained directly instead of routing the request to the remote content server. Another new functional entity is for the update of the caching content. The content demand of the UEs can be tracked by the CCU 1502 for making caching decision. The caching storage may use the caching decision made by the CCU 1502 to update its content. Furthermore, the access GW 1512 may also help to reduce the load of the core network for M2M traffics.

Figure 16:
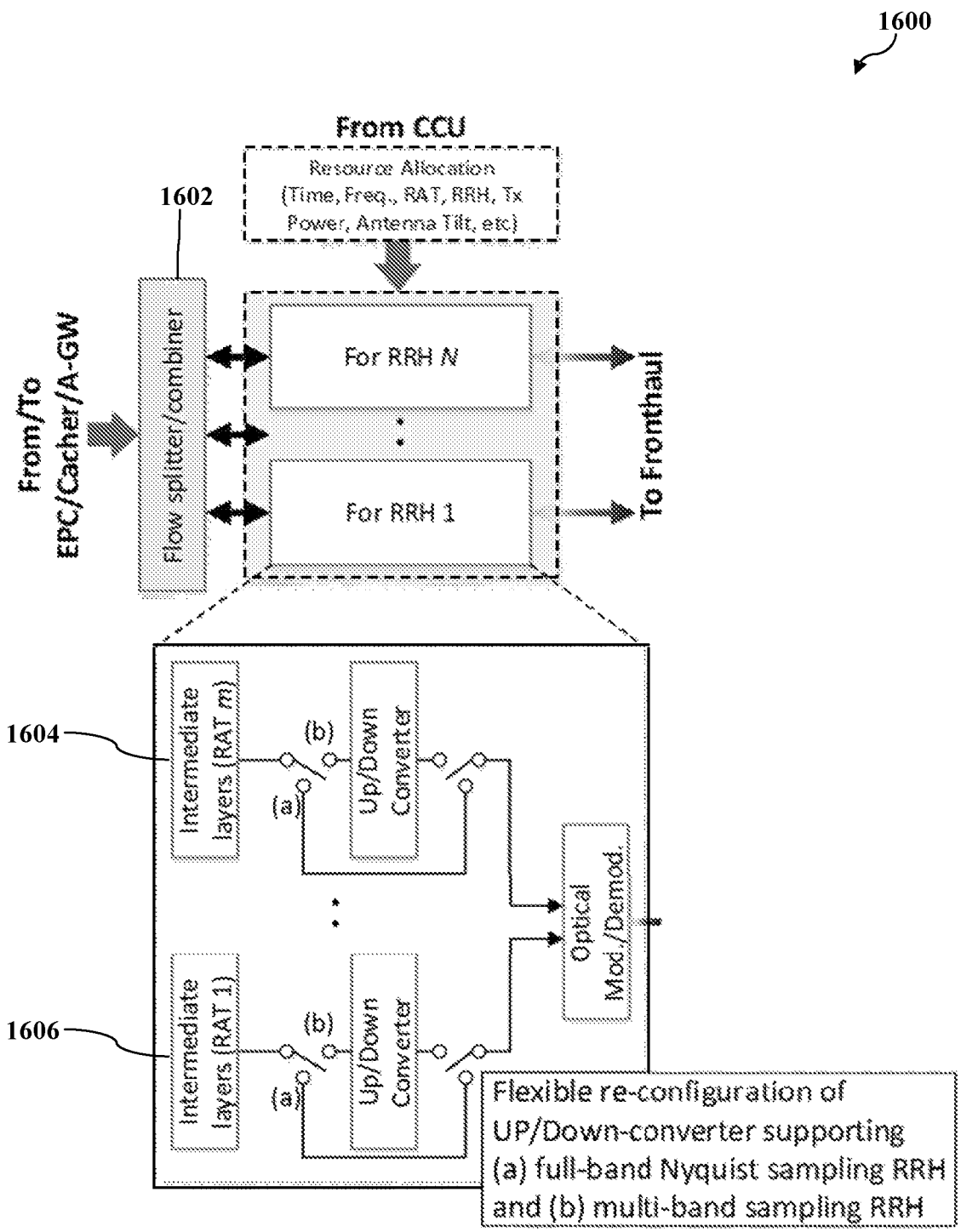
FIG. 16 is a diagram illustrating an example block diagram of a BBU.

FIG. 16 is a diagram illustrating an example block diagram of a BBU 1600. As shown in FIG. 16, a flow splitter 1602 is added to the BBU 1600. The flow splitter 1602 may be needed because each RRH may support multiple RATs and the flow may be routed to the P-GW in the core network or to the access GW. The flow splitter 1602 may also determine how to split the flow among the available RATs. The protocol stack (intermediate layers 1604, 1606 in FIG. 16) of the supported RATs may be implemented in the BBU 1600. The discussion on the placement of the protocol stack is deferred to FIG. 17 below. For LTE standard, these protocols include Packet Data Convergence Protocol (PDCP), Radio Link Control (RLC), Medium Access Control (MAC), and Physical (PHY) layers. With the resource allocation decisions from CCU, it follows the corresponding protocols for the transmission of the packets. Note that some control decisions (such as scheduling at MAC layer) that are based on frequently varying parameters should preferably be made at the BBU 1600. This is to reduce the response time to these frequently varying parameters. The baseband signal is further processed, depending on the architecture of the RRH, and then transmitted optically to the RRH.

Figure 17:
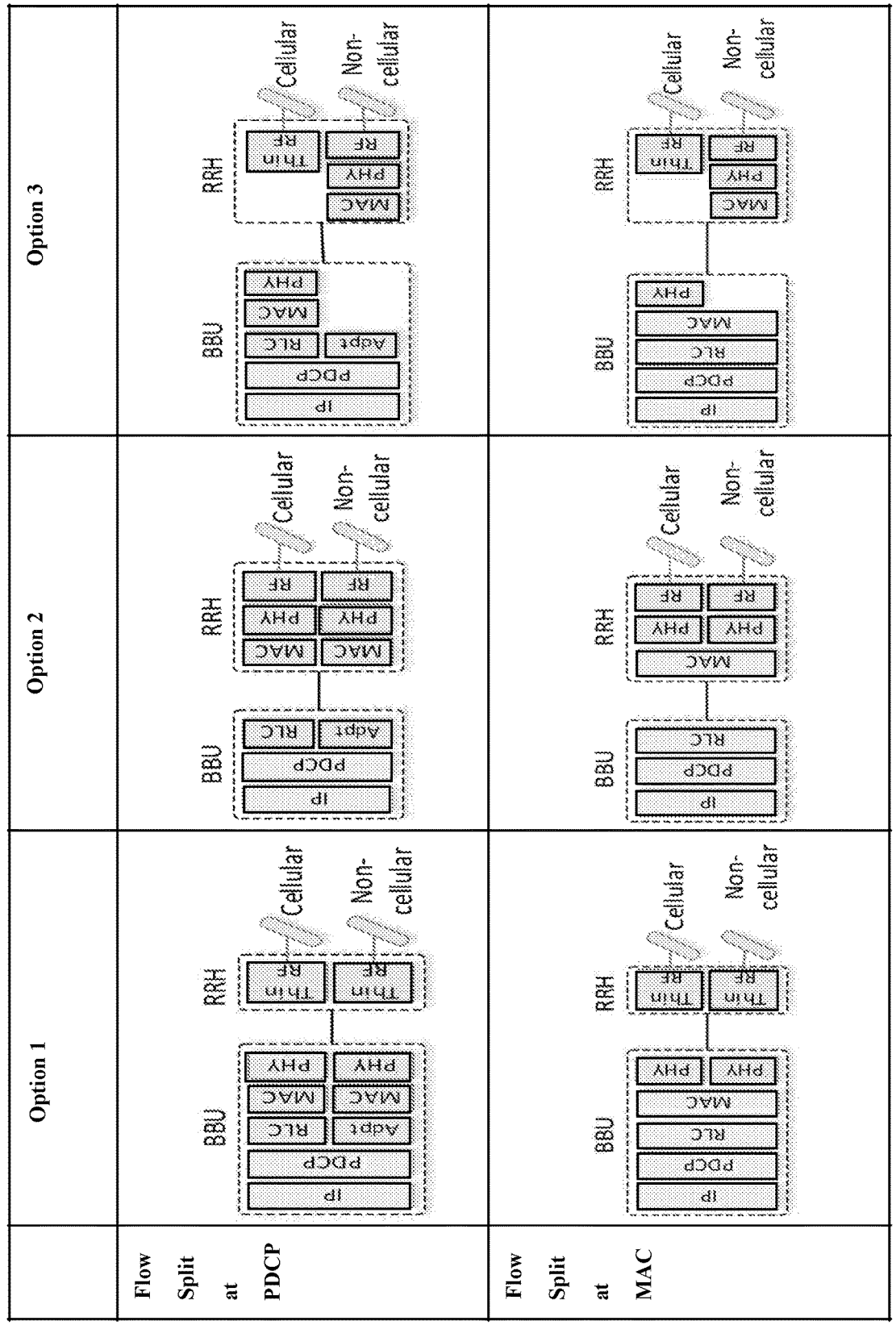
FIG. 17 is a table showing protocol layer splitting options between BBU/CCU and RRH.

With the C-RAN architecture of some embodiments, more flexibility may be available in splitting the multiple layers in each RAT between the RRH and the BBU/CCU. FIG. 17 is a table 1700 showing protocol layer splitting options between BBU/CCU and RRH. In one embodiment, the partition of the protocol layers may be determined via the type of flow split and the type of communication protocol. The flow may be either split at the PDCP or the MAC layer. The types of communication protocols may include cellular communication protocols and non-cellular communication protocols.

The thin RF layer in the RRH as described above leads to option 1 in Table 1700. For option 1, the RRH may support digital to analog signal conversion, power amplification, and transmission of multi-RAT, and the rest of the layers are implemented at the BBU, including the PHY and MAC. When there is a very tight latency requirement, it can be very difficult to meet the tight latency requirement by the solution of option 1 due to delay incurred in the fronthaul. For example, for 5G, end-to-end delay of 1 ms has been specified for tactile interne, for Wi-Fi, as short as 16 µs is is given from the end of receiving a packet to the beginning of transmitting the ACK/NACK information back. Moreover, Wi-Fi also requires time-sensitive procedure like carrier sensing.

One simple way to overcome the latency issue is to place the MAC and PHY layers of the multi-RATs at the RRH and the other layers the BBU, as in option 2 in Table 1700. With the MAC layers implemented at the RRH, the type of information carried over the fronthaul is only the information bits and this reduces the capacity requirement. Moreover, the delay incurred by the fronthaul does not affect the delay-sensitive functions such as carrier sensing in Wi-Fi that is implemented at the RRH. However, low level cooperation across RRHs may require additional overhead via fronthaul.

One disadvantage of option 2 is the heavy duty of RRH. To allow for benefiting from the simple and thin RF implementation described above and at the same time addressing the delay requirement of some RATs, option 3 as illustrated in Table 1700 is provided. In option 3, the non-delay-critical RATs follow the layer splitting structure in option 1, and the delay-critical RATs follow the layer splitting structure in option 2.

Figure 18:
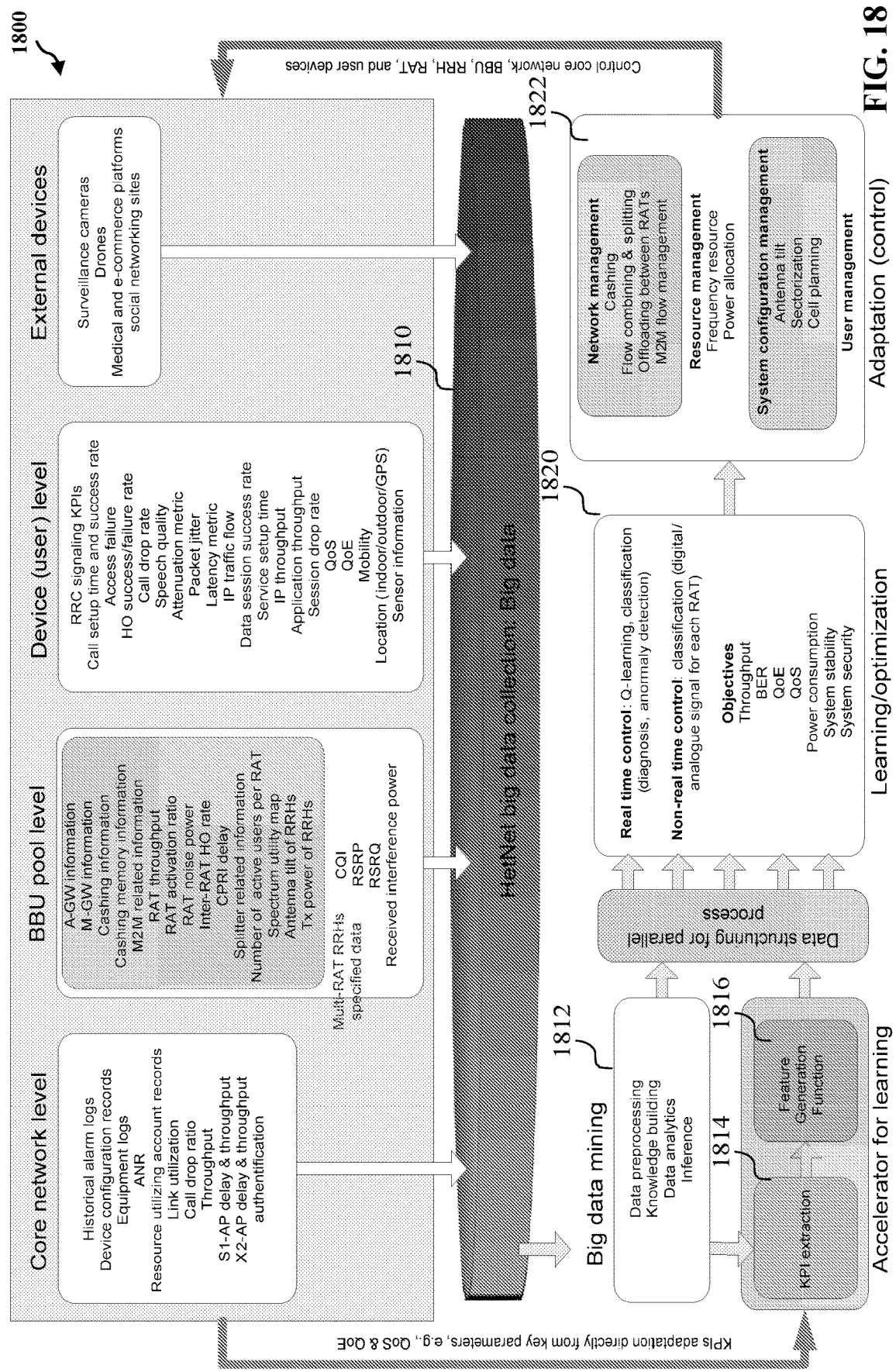
FIG. 18 is a block diagram illustrating an example of CCU with big data.

FIG. 18 is a block diagram illustrating an example of CCU 1800 with big data. In one embodiment, the CCU 1800 may use a statistical learning tool to fulfill the requirements of 5G. Under the framework illustrated in FIG. 18, big data may be characterized in the context of HetNet, and heterogeneous RATs may be identified. The big data 1810 in the context of HetNet may be referred to as a HetNet empowering big data (HetNet-B).

The first procedure 1812 is a step mining (or analyzing) the collected big data 1810 including structured and unstructured data set generated by ubiquitous communications with mobile devices, multi-RAT RRHs, BBU, CCU, core networks, as well as external devices, such as surveillance cameras, drones, medical and e-commerce platforms, and social networking sites.

Throughout the first data collection and mining procedure 1812, structured data is processed, and inference and information is obtained from data analytics. Concretely, specific machine learning and data analytics tools that can be exploited are explicated to transform big data into the right and compact data that can provide a readily useable knowledge for sequel optimization or adaptation algorithms.

Along with the data processing, to accelerate subsequent learning or optimization process, an optionally additional process with two parts may be considered. The first part is key performance indicator (KPI) extraction step 1814. From the inferred data or directly from the collected big data, the KPI extractor 1814 selects a few core metrics which are tightly related to a specific target application. The second step 1816 is to generate features from the selected KPIs to prepare parallel learning/optimization process and to accelerate it. To this end, any type of function, such as linear and nonlinear functions, may be employed to combine/compress multiple KPIs.

The optimization or adaptation algorithms are designed to improve predetermined objectives. The predetermined objectives may include, for example, as listed in FIG. 18, throughput, BER, QoE, QoS, energy efficiency, stability, security and so forth. The optimization 1820 or adaptation 1822 may manage two parts: networks and resources. The network management is performed by controlling (optimizing/adapting) caching function and M2M flow at CCU, and flow combining and spitting at BBU. The resource management is mainly to assign frequency and power resources at the RRH and RAT. The resultant dynamicity of the HetNet-B from the new framework makes the network more agile and hence fulfills the essential service requirements.

Figure 19:
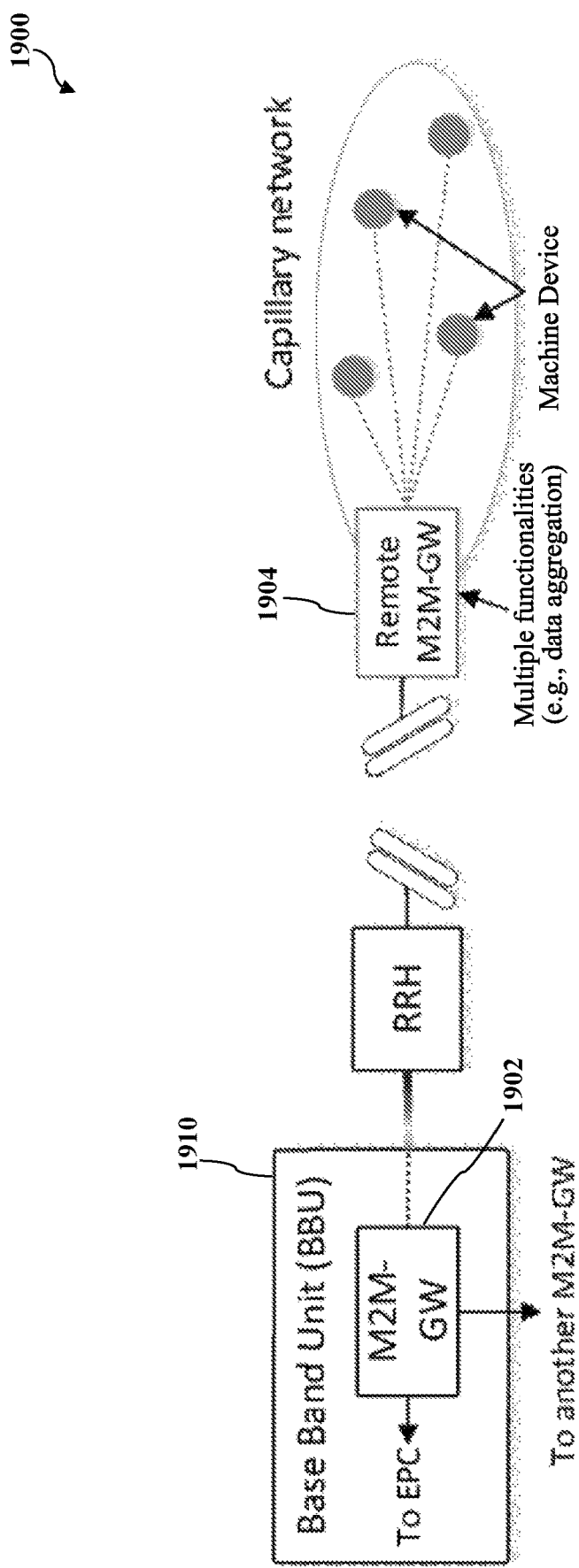
FIG. 19 is a diagram illustrating an example of the architecture for M2M communications.

FIG. 19 is a diagram illustrating an example of the architecture 1900 for M2M communications. In the example, the M2M communication may be offloaded via M2M-GW 1902. In one embodiment, the M2M-GW 1902 may be the access gateway 202 describe above in FIG. 2. The M2M traffic may flow from the remote M2M-GW 1904 to the M2M-GW 1902 at the BBU/CCU 1910 and vice versa. The functions of the M2M-GW 1902 may include one or more of routing M2M traffic to EPC or other M2M-GW, data fusion, path monitoring and QoS assignment, or protocol relay. The functions of the remote M2M-GW 1904 may include one or more of data aggregation, RAT selection and link aggregation.

Other than data aggregation for the capillary network, the remote M2M-GW 1904 may select the type of RATs for the transmission. Since multi-RATs are available at the BBU 1910, link aggregation may be done at the remote M2M-GW 1904.

The main function of the M2M-GW 1902 is to route the M2M traffic to the M2M server via other M2M-GWs. In this way, the M2M traffic can be offloaded from the EPC so as to reduce the latency of the transmission. When the M2M-GW 1902 is overloaded, the traffic may be routed to the EPC. Although data aggregation may have been done at the remote M2M-GW 1904, further data fusion may be done at the M2M-GW 1902 as the C-RAN can provide context information from its more global view on the various networks of devices. Another function of the M2M-GW 1902 is to monitor the transmission path and assign QoS to the M2M traffic. Finally, higher layer functions, e.g., relay protocol, may be supported at the M2M-GW 1902 to allow the coexistence of heterogeneous M2M networks.

In some embodiments, a software-defined cognitive HetNet transceiver architecture is provided. The software-defined cognitive HetNet transceiver architecture may support multiple RATs over multiple spectrums with a very thin and generic-purpose remote radio head, software-defined multi-RAT BBU, big data-assisted context-aware CCU which virtualizes the multi-RATs and the time-frequency radio resources to match the radio resource and RAT with the services, and native support of M2M communications.

In one embodiment, the software-defined cognitive HetNet transceiver architecture may include an RRH. The RRH may comply with an all-digital architecture supporting multiple RATs. The RRH may have three designs: full-band Nyquist rate sampling based architecture, multi-band Nyquist rate sampling based architecture, and multi-band sub-Nyquist rate sampling based architecture. There may be baseband implementation at the RRH to support delay-critical RATs.

In one embodiment, the software-defined cognitive HetNet transceiver architecture may include a BBU. The BBU may provide interface support to the multi-RAT RRH. For example, the BBU may perform flow splitting and include digital stream multiplexer/demultiplexer. The BBU may adapt through CCU interaction.

In one embodiment, the software-defined cognitive HetNet transceiver architecture may include a CCU with big data. The CCU may include a module collecting data from multi-RAT RRHs. The CCU may include an adaptive KPI extractor providing essential performance metrics. The CCU may provide a control mechanism between corrected data and the KPI extractor. The CCU may include a feature generation function that may combine/compress multiple KPIs into a few features using the function. The CCU may perform network management using big data analytics. The network management performed by the CCU may include caching, flow combining and splitting, offloading between RATs, and M2M flow management. The CCU may perform system configuration management using big data analytics including antenna tilt adaptation, sectorization, and cell planning. The general framework managing core network, CCU, BBU, RRH, RAT, and devices for HetNet using big data is illustrated above in FIG. 18.

In one embodiment, the software-defined cognitive HetNet transceiver architecture may support MTC. In one embodiment, the software-defined cognitive HetNet transceiver architecture may include a M2M GW at the BBU. The M2M GW may route M2M traffic to EPC or other M2M-GW. The M2M GW may perform data fusion. The M2M GW may perform path monitoring and QoS assignment. The M2M GW may perform protocol relay.

In one embodiment, the software-defined cognitive HetNet transceiver architecture may include a remote M2M GW. The remote M2M GW may perform data aggregation, RAT selection and link aggregation.

Figure 20:
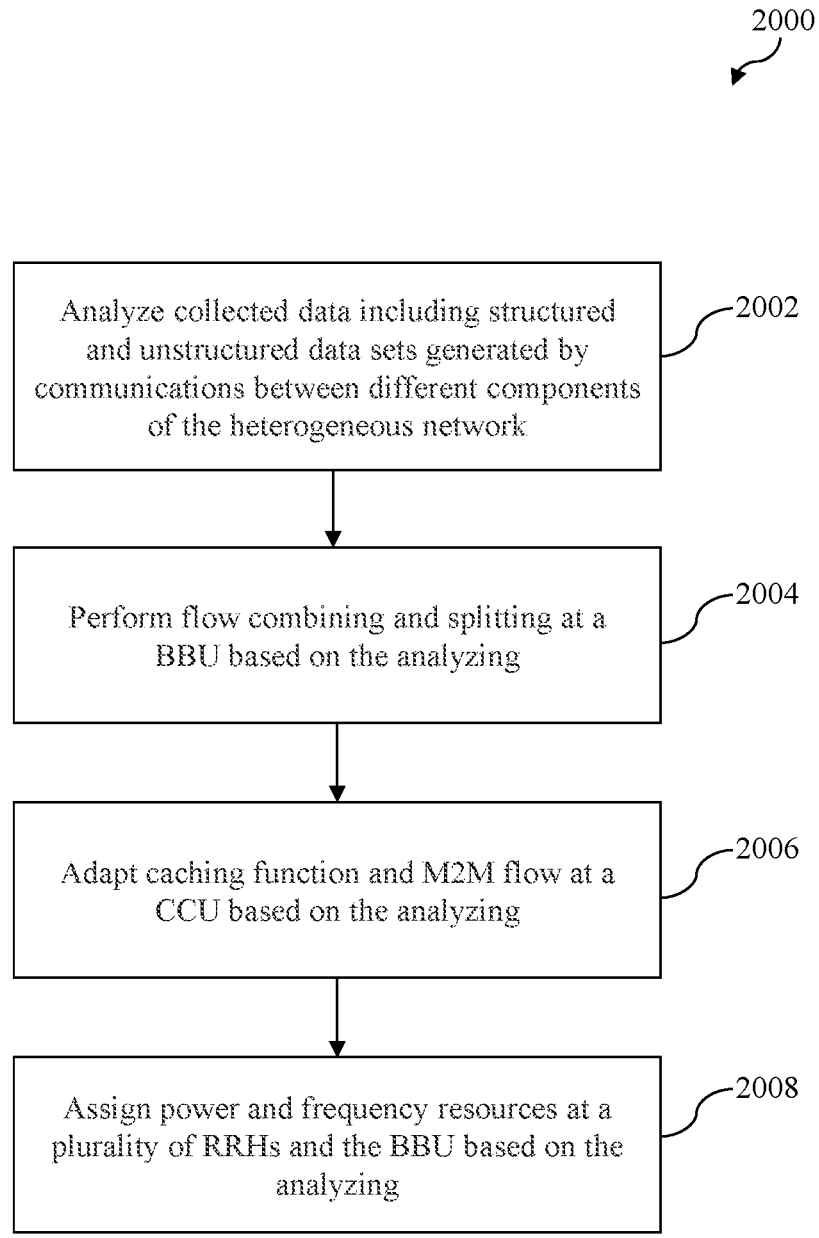
FIG. 20 is a flowchart of a method of centralized control of a heterogeneous network.

FIG. 20 is a flowchart 2000 of a method of centralized control of a heterogeneous network. The method may be performed by a BBU and/or CCU. At 2002, the method may analyze collected data including structured and unstructured data sets generated by communications between different components of the heterogeneous network.

At 2004, the method may perform flow combining and splitting at a BBU based on the analyzing. The BBU may be configured to provide interface support to a plurality of RRHs. Each RRH of the plurality of RRHs may support multiple RATs.

In one embodiment, the BBU may be reconfigurable to support adaptive signal processing and sampling approaches of the plurality of RRHs. In one embodiment, the heterogeneous network may operate with a plurality of RATs over a plurality of carrier frequencies.

At 2006, the method may adapt caching function and M2M flow at a CCU based on the analyzing. The CCU may be configured to control the BBU and the plurality of RRHs. The BBU may be connected to the plurality of RRHs via high-speed fronthaul links.

At 2008, the method may assign power and frequency resources at a plurality of RRHs and the BBU based on the analyzing. In one embodiment, to assign power and frequency resources, the method may determine an optimal sampling frequency for a RRH, and send the optimal sampling frequency to the RRH to set variable-rate sampler parameters for the RRH.

Figure 21:
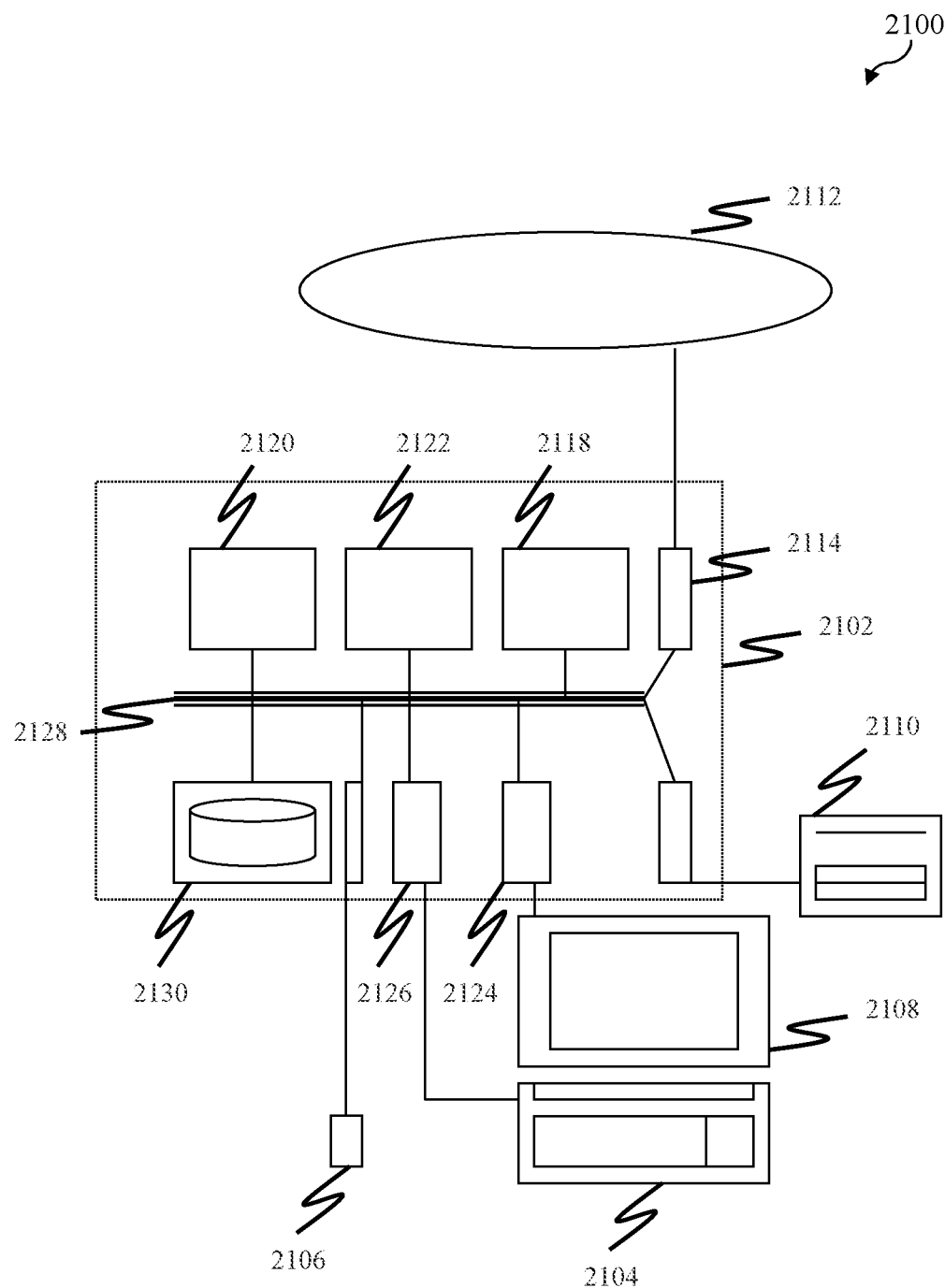
FIG. 21 depicts a schematic drawing of an exemplary computer system.

The methods or functional modules of the various example embodiments as described hereinbefore may be implemented on a computer system, such as a computer system 2100 as schematically shown in FIG. 21 as an example only. The method or functional module may be implemented as software, such as a computer program being executed within the computer system 2100, and instructing the computer system 2100 to conduct the method of various example embodiments. The computer system 2100 may include a computer module 2102, input modules such as a keyboard 2104 and mouse 2106 and a plurality of output devices such as a display 2108, and a printer 2110. The computer module 2102 may be connected to a computer network 2112 via a suitable transceiver device 2114, to enable access to e.g. the Internet or other network systems such as Local Area Network (LAN) or Wide Area Network (WAN). The computer module 2102 in the example may include a processor 2118 for executing various instructions, a Random Access Memory (RAM) 2120 and a Read Only Memory (ROM) 2122. The computer module 2102 may also include a number of Input/Output (I/O) interfaces, for example I/O interface 2124 to the display 2108, and I/O interface 2126 to the keyboard 2104. The components of the computer module 2102 typically communicate via an interconnected bus 2128 and in a manner known to the person skilled in the relevant art.

It will be appreciated to a person skilled in the art that the terminology used herein is for the purpose of describing various embodiments only and is not intended to be limiting of the present invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

It is understood that the specific order or hierarchy of blocks in the processes/flowcharts disclosed is an illustration of exemplary approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "ABC or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

What is claimed is:

1. A system for controlling a network, comprising:
   a plurality of remote radio heads, wherein each remote radio head of the plurality of remote radio heads is configured to support multiple radio access technologies;
   a circuit configured to provide interface support to the plurality of remote radio heads; and
   a controller configured to control the circuit and the plurality of remote radio heads,
      wherein the circuit is connected to each remote radio head of the plurality of remote radio heads via one or more respective fronthaul communication links, and
      wherein said each remote radio head comprises one or more sampling circuits configured to support the multiple radio access technologies, wherein the circuit is reconfigurable to support adaptive signal processing and sampling of the plurality of remote radio heads.

2. The system of claim 1, wherein the circuit is created using a virtualization engine running on a cluster of servers with a plurality of hardware accelerators.

3. The system of claim 1, wherein the controller is configured to control the circuit and the plurality of remote radio heads based on statistical information inferred from data traversing through the circuit and real time network state information of the network.

4. The system of claim 1, wherein the controller is configured to control a plurality of circuit instances in a circuit pool, wherein the plurality of circuit instances include the circuit.

5. The system of claim 1, further comprising an access gateway configured to support machine-to-machine (M2M) communications.

6. The system of claim 5, wherein the access gateway allocates an Internet Protocol prefix to a mobile terminal device from a pool of prefixes managed by the access gateway.

7. The system of claim 5, wherein the access gateway is connected to a caching storage, wherein the controller is configured to track content demands of a plurality of mobile terminal devices to make caching decisions for the caching storage.

8. The system of claim 5, wherein the circuit comprises a flow splitter configured to split a traffic flow between the access gateway and a Packet Data Network gateway, the flow splitter further configured to split the traffic flow among available radio access technologies.

9. The system of claim 1, wherein the network operates with a plurality of radio access technologies over a plurality of carrier frequencies.

10. The system of claim 1, wherein the circuit is further configured to send a first plurality of digital signals to the plurality of remote radio heads and receive a second plurality of digital signals from the plurality of remote radio heads.

11. The system of claim 1, wherein the circuit or the controller is configured to:
   determine an optimal sampling frequency for a remote radio head; and
   send the optimal sampling frequency to the remote radio head to set variable-rate sampler parameters for the remote radio head.

12. The system of claim 1, wherein the controller is configured to manage radio resources for the plurality of remote radio heads, wherein the radio resources comprise time-frequency blocks and radio access technologies.

13. The system of claim 1, wherein the controller determines a split of protocol layers of a radio access technology between the circuit and a remote radio head based on delay requirement of the radio access technology.

14. The system of claim 1, wherein the circuit is configured as a baseband circuit.

15. The system of claim 1, wherein the one or more sampling circuits of said each remote radio head is configured to perform signal sampling and digitization to generate a digital bit stream for transmission to the circuit via the respective fronthaul communication link.

* * * * *